United States Patent
Mimamino et al.

(10) Patent No.: US 7,388,692 B2
(45) Date of Patent: Jun. 17, 2008

(54) COLOR IMAGE PROCESSING DEVICE AND COLOR IMAGE PROCESSING METHOD

(75) Inventors: Katsushi Mimamino, Kyoto (JP); Tetsuharu Yamaguchi, Uji (JP); Hirofumi Namikawa, Kameoka (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 711 days.

(21) Appl. No.: 10/944,504

(22) Filed: Sep. 17, 2004

(65) Prior Publication Data

US 2005/0063017 A1 Mar. 24, 2005

(30) Foreign Application Priority Data

| Sep. 24, 2003 | (JP) | ............................. 2003-332574 |
| Oct. 30, 2003 | (JP) | ............................. 2003-371324 |
| Dec. 24, 2003 | (JP) | ............................. 2003-426126 |
| Jul. 16, 2004 | (JP) | ............................. 2004-209968 |

(51) Int. Cl.
H04N 1/04 (2006.01)
H04N 1/46 (2006.01)

(52) U.S. Cl. .................. 358/483; 358/505; 358/514

(58) Field of Classification Search ................ 358/514, 358/512, 523, 528, 505, 483, 524, 515, 401, 358/451, 474, 482, 496, 497, 500, 501, 504, 358/513, 530; 355/32, 41, 18; 348/97, 98, 348/99, 100
See application file for complete search history.

(56) References Cited

U.S. PATENT DOCUMENTS

2003/0076554 A1* 4/2003 Ide ............................. 358/514

2004/0036930 A1* 2/2004 Namikawa et al. .......... 358/513

FOREIGN PATENT DOCUMENTS

| JP | 63-078659 | 4/1988 |
| JP | 01-141460 | 6/1989 |
| JP | 07-111561 | 4/1995 |
| JP | 2001-217976 | 8/2001 |
| JP | 2003-060846 | 2/2003 |
| JP | 2003-219116 | 7/2003 |

* cited by examiner

*Primary Examiner*—King Poon
*Assistant Examiner*—Peter L Cheng
(74) *Attorney, Agent, or Firm*—Hogan & Hartson LLP

(57) ABSTRACT

A color image processing device includes an acquiring unit that acquires sample values of an original document at a prescribed cycle from a plurality of line sensors provided in parallel with a main scanning direction at a prescribed interval between one another, a storage unit having a capacity that stores the sample values for a prescribed number of samplings and a transferring unit that transfers relatively the original document and sampling positions of the line sensors. A correction unit corrects by carrying out a gap correction process for correcting a gap of the sampling positions of each of the line sensors in accordance with the sample values stored in the storage unit and an instructing unit instructs the transferring unit. In accordance with a rate of magnification for scanning the original document and the capacity of the storage unit, the instructing unit determines whether the gap correction process according to the rate of magnification can be carried out. When the gap correction process can be carried out, the instructing unit instructs the transferring unit to transfer at a correction speed so that a sample value to be used for the gap correction process can be acquired.

12 Claims, 16 Drawing Sheets

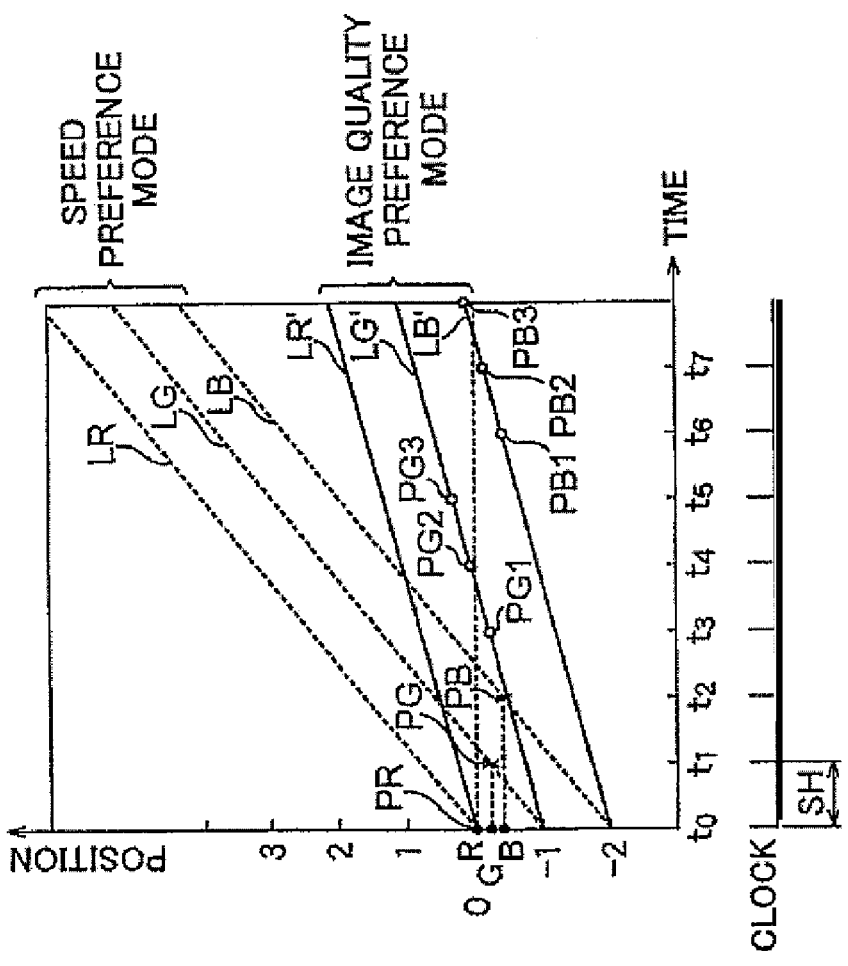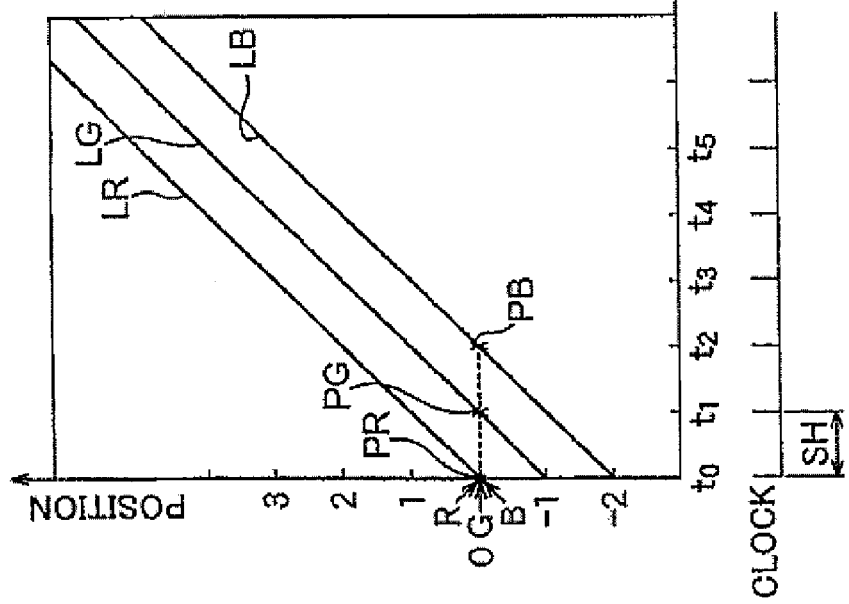

50% (REDUCTION)

COLOR IMAGE PROCESSING DEVICE AND COLOR IMAGE PROCESSING METHOD

BACKGROUND OF THE INVENTION

1. Field of the Invention

The present invention relates to a color image processing device which processes color image data generated by scanning an original document.

2. Description of the Related Art

A scanner device is used independently or loaded in a copy machine or the like to be used for, for example, converting an original document printed on paper into digital data. Recently, a color scanner device, which can scan an original document by color, is becoming widespread. For example, such a color scanner device includes line sensors for individually scanning each of a red component (R), a green component (G) and a blue component (B). In accordance with voltage values obtained from the line sensors, the color scanner device generates image data. Each of the RGB line sensors is provided in parallel to a main scanning direction at a prescribed interval between one another (hereinafter simply referred to as a "line gap"). Therefore, at a prescribed timing, each of the line sensors is scanning different lines on the original document, respectively. A line correction memory is provided for accumulating pixel data acquired from each of the line sensors. The pixel data of a preceding line sensor is loaded from the line correction memory with a delay. By composing the loaded pixel data, pixel data of a RGB format is generated for the same line. Then, by combining the pixel data of the RGB format generated for each line, image data of the original document is generated.

In case a sampling cycle of the line sensors is constant, a rate of magnification in a scanning process of the original document is determined by a relative transferring speed of sampling positions of the line sensors with respect to the original document. For example, when enlarging an original document, the transferring speed is decreased. When reducing an original document, the transferring speed is increased. Therefore, according to the transferring speed, there are cases in which each of the line sensors cannot scan the same line on the original document. When the pixel data acquired from each of the line sensors is composed in this case, the image quality deteriorates. As the technology for correcting such a gap in the scanning lines generated by enlarging or reducing a document, there is technology being proposed to change the sampling cycle and the time for starting a main scanning process in each of the line sensors.

According to the above-described conventional technology, the sampling timing of each of the line sensors (the time for starting the main scanning process) is controlled according to the rate of magnification. Therefore, the same line can be scanned at any rate of magnification. However, hardware for controlling the sampling timing for each of the line sensors is necessary to be provided in both the line sensors and the control circuit. The hardware cannot be shared and as a result, the device results in being expensive.

SUMMARY OF THE INVENTION

The present invention has been made in consideration of the above circumstance. An advantage of the present invention is to provide a color image scanning process technology which can suppress deterioration of an image quality generated according to a rate of magnification and which can carry out a scanning process efficiently according to a circumstance.

An aspect of the present invention is a color image processing device. The color image processing device includes an acquiring unit, a storage unit, a transferring unit, a correction unit and an instructing unit. The acquiring unit acquires a sample value of an original document at a prescribed cycle from a plurality of line sensors provided in parallel with a main scanning direction at a prescribed interval between one another. The storage unit has a capacity of storing sampling values for a prescribed number of samplings. The transferring unit relatively transfers the original document and sampling positions of each of the line sensors. The correction unit corrects a gap in the sampling positions of each of the line sensors in accordance with the sampling values stored in the storage unit. In accordance with a rate of magnification for scanning the original document and the capacity of the storage unit, the instructing unit determines whether or not a gap correction process according to the rate of magnification can be carried out. In case the gap correction process can be carried out, the instructing unit instructs the transferring unit so that the original document and the sampling positions of each of the line sensors transfer relatively at a correction speed capable of acquiring a sample value to be used for the correction. Accordingly, in accordance with the capacity of the storage unit and the rate of magnification, a determination can be made as to whether or not to carry out a correction of the sampling positions of each of the line sensors.

According to the present invention, conditions for scanning the original document can be determined automatically according to the capacity of the storage unit of the color image processing device. Therefore, the present invention can present a highly convenient color image processing device. Further, any combination of the above-described constituent elements and conversions of the expression of the present invention between a method, a device and a system or the like are also effective as an embodiment of the present invention.

The above-described color image processing device further includes a holding unit which holds a prescribed rate of magnification. The prescribed rate of magnification is calculated in accordance with the capacity of the storage unit and a number of samplings necessary for executing the gap correction process according to a rate of magnification. The prescribed rate of magnification is referenced for determining whether or not the gap correction process can be executed. In case a rate of magnification is lower than the prescribed rate of magnification, the instructing unit instructs the transferring unit to transfer at the correction speed. In case a rate of magnification is the prescribed rate of magnification or higher, the instructing unit instructs the transferring unit to transfer at a speed different from the correction speed. Accordingly, the gap correction can be carried out within a necessary range without increasing the storage capacity, and the storage unit can be used efficiently.

Another aspect of the present invention is a color image processing device. The color image processing device includes an acquiring unit, a storage unit, a transferring unit, a correction unit and a calculation unit. The acquiring unit acquires a sample value of an original document at a prescribed cycle from a plurality of line sensors provided in parallel with a main scanning direction at a prescribed interval between one another. The storage unit has a capacity capable of storing sampling values for a prescribed number of samplings. The transferring unit relatively transfers the original document and sampling positions of each of the line sensors. The correction unit corrects a gap in the sampling positions of each of the line sensors in accordance with the sample value acquired by scanning the original document at a speed calculated by dividing the transferring speed by a prescribed division number. Further, the transferring speed is determined according to a rate of magnification for scanning the original document. The calculation unit calculates the division number in accordance with the rate of magnification and the capacity of the storage unit. Accordingly, since a large division number can be set as far as the capacity of the storage unit permits, the gap can be minimized.

According to the present invention, conditions for scanning the original document can be determined automatically according to the capacity of the storage unit of the color image processing device. Therefore, the present invention can present a highly convenient color image processing device. Further, any combination of the above-described constituent elements and conversions of the expression of the present invention between a method, a device and a system or the like are also effective as an embodiment of the present invention.

Another aspect of the present invention is a color image processing device. The color image processing device includes a plurality of line sensors provided in parallel with a main scanning direction at a prescribed interval between one another. The color image processing device also includes an accumulating unit, a transferring unit, a generating unit, a control unit and a moving unit. The accumulating unit receives and accumulates an output value of the line sensors at a prescribed cycle. The transferring unit relatively transfers an original document and sampling positions of the line sensors. In accordance with the output values received from each of the line sensors, the generating unit generates image data according to a rate of magnification for scanning the original document. The control unit controls the transferring unit under either one of a first mode or a second mode. In case of the first mode, during a period of time when the sampling positions of the line sensors transfer a prescribed distance with respect to the original document, the control unit controls a relative transferring speed of the original document and the sampling positions of the line sensors by the transferring unit so that the output values can be acquired at a plurality of timings. In case of the second mode, during a period of time when the sampling positions of the line sensors transfer a prescribed distance with respect to the original document, the control unit controls the transferring speed so that one output value can be acquired. The moving unit receives a designation of the first mode or the second mode from a user and moves the control unit under the first mode or the second mode designated by the user. Accordingly, the mode can be switched between the first mode and the second mode according to the intension of the user. Under the first mode, a plurality of image data is scanned while the sampling positions of the line sensors transfer a prescribed interval on the original document. Therefore, the transferring speed in the first mode is necessary to be slower compared with the transferring speed in the second mode. Although the first mode requires a longer period of time for the process than the second mode, the first mode can scan an original document at a higher image quality than the second mode.

The color image processing device further includes a setting unit which sets a rate of magnification. In case 100% magnification is set by the setting unit, the control unit switches a default state to the second mode in advance. In case an enlargement or a reduction of the document is set by the setting unit, the control unit switches the default state to the first mode in advance. Accordingly, in case each of the line sensors cannot scan the same line on the original document by the set rate of magnification, in other words, in case a gap is generated in the lines scanned by each of the line sensors, the second mode is switched automatically as a default. That is, the default mode is switched so that an image quality is prioritized.

According to the present invention, the user can select a policy for the scanning process of the original document. Therefore, the present invention can present a highly convenient color image processing device.

The color image processing device can further include a setting unit which sets the default state of the control unit under the first mode or the second mode in advance. Accordingly, according to the policy of the user, in other words, whether to prioritize the image quality or whether to prioritize the speed, either one of the policies can be set in advance.

Any combinations of the above-described constituent elements and conversions of the expression of the present invention between a method, a device and a system or the like are also effective as an embodiment of the present invention.

According to another aspect of the present invention, a color image processing device includes a plurality of sensors, an acquiring unit, a storage unit, a transferring unit, a setting unit and a control unit. The sensors are arranged in a sub scanning direction at a prescribed interval (line gap) between one another. The acquiring unit acquires a sample value of an image of an original document at a prescribed (constant) driving cycle (SH) from the plurality of the line sensors. The storage unit stores the sample value for a plurality of lines. The transferring unit relatively transfers the original document and sample positions of the line sensors on the original document. The setting unit sets a scanning rate of magnification for scanning the original document. The control unit controls a relative transferring speed by the transferring unit. The control unit controls to switch a mode between a first mode and a second mode in accordance with the set scanning rate of magnification. Under the first mode (a mode with a gap correction), the relative transferring speed is set 1/M times (1/3 times) a speed corresponding to the rate of magnification for the scanning process. In addition, a scanning cycle is set M times (3 times) the driving cycle. A prescribed (one) sample value is selected from M (three) sample values acquired in one scanning cycle and the selected sample value is handled as a scanning value. Under the second mode (a mode without a gap correction), the relative transferring speed is set at the speed corresponding to the rate of magnification for the scanning process. In addition, a scanning cycle (a period of time for scanning data of one line) corresponds with the driving cycle.

According to the present invention, from an aspect of both the gap correction and the scanning time (relative transferring speed), the scanning process can be carried out efficiently while maintaining a high image quality.

In the color image processing device according to the present invention, when 100% magnification or an enlargement is set as the set rate of magnification, the control unit selects the second mode. When a reduction is set as the set rate of magnification, the control unit selects the first mode. Accordingly, in case of 100% magnification or an enlargement where the relative transferring speed is slow and an effect of the gap correction is not so large compared with a reduction, the scanning process is carried out under the second mode. Therefore, the scanning process can be carried out within a short period of time with high image quality. In case of a reduction where the relative transferring speed is fast and the effect of the gap correction is large compared with an enlargement, the scanning process is carried out under the first mode. Therefore, the scanning process can be carried out with high image quality without the scanning time lengthening notably.

In the color image processing device according to the present invention, in case 100% magnification or an enlargement with a high rate of magnification is set as the set rate of magnification, the control unit selects the second mode. In case a reduction or an enlargement with a low rate of magnification is set as the set rate of magnification, the control unit selects the first mode. Accordingly, in case of 100% magnification or an enlargement with a high rate of magnification where the relative transferring speed is slow and an effect of the gap correction is not so large compared with a reduction or an enlargement with the low rate of magnification, the scanning process is carried out under the second mode. Therefore, the scanning process can be carried out within a short period of time with high image quality. In case of a reduction or an enlargement with the low rate of magnification where the relative transferring speed is fast and the effect of the gap correction is large compared with an enlargement with the high rate of magnification, the scanning process is carried out under the first mode. Therefore, the scanning process can be carried out with high image quality without the scanning time lengthening notably.

The color image processing device according to the present invention further includes an operation unit which can select a normal mode and a correction mode. When the correction mode is selected, the mode can be switched between the first mode and the second mode. Accordingly, other than the normal image processing, from the aspect of both the gap correction and the scanning time, an image processing capable of maintaining high image quality and carrying out the scanning process efficiently can be selected.

BRIEF DESCRIPTION OF THE DRAWINGS

FIG. 1A is a graph showing a relationship between sampling positions and sampling timings of each of line sensors when scanning an original document at 100% magnification. FIG. 1B is a graph showing a relationship between the sampling positions and the sampling timings of each of line sensors when scanning the original document at a rate of magnification of 125%.

DETAILED DESCRIPTION OF THE PREFERRED EMBODIMENTS

Figure 2:
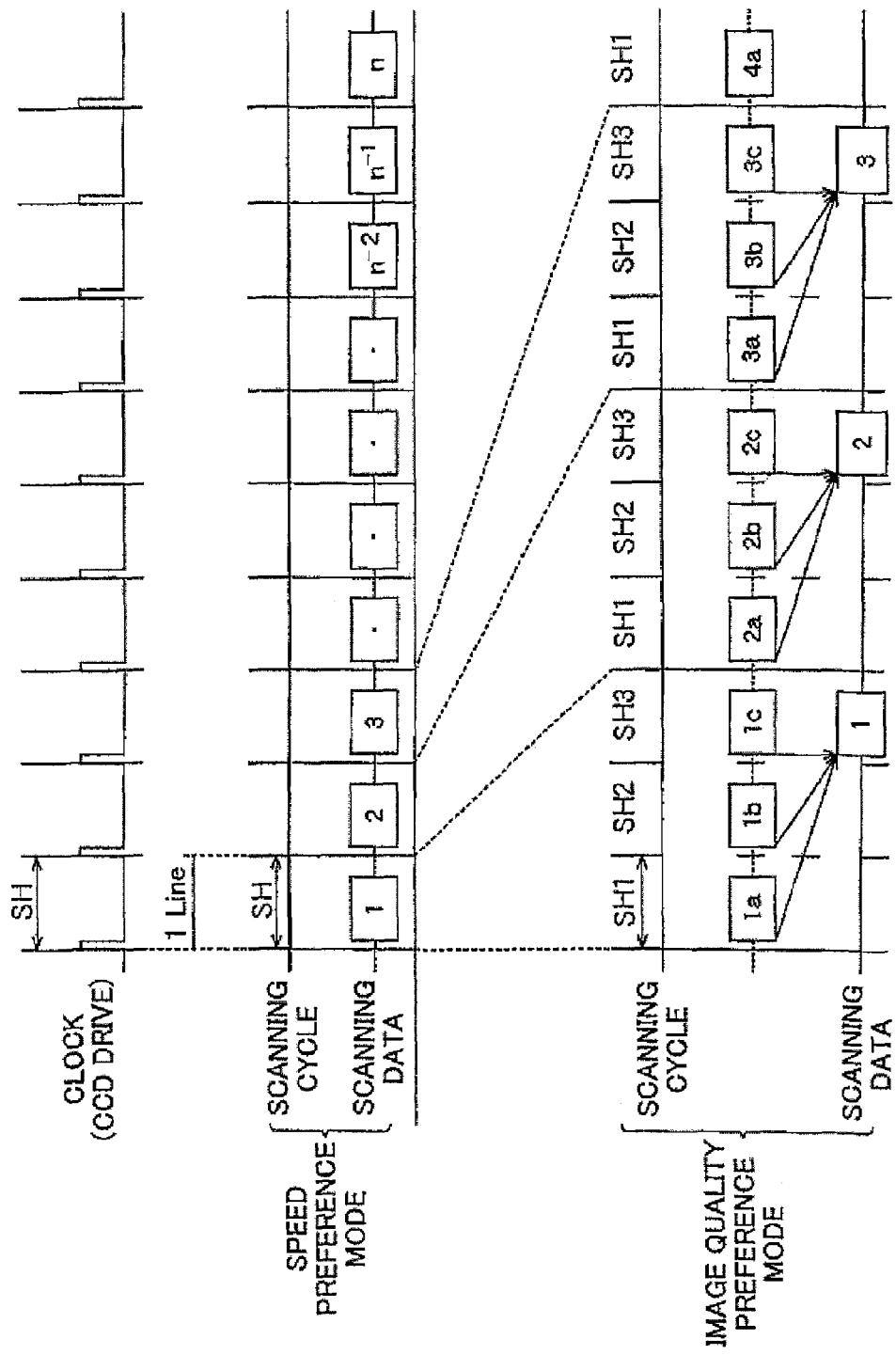
FIG. 2 schematically shows a speed preference mode and an image quality preference mode referred in FIG. 1B.

Embodiments of the present invention will be described.

First Embodiment

FIG. 1A is a graph showing a relationship between sampling positions and sampling timings of each of the line sensors when scanning an original document at 100% magnification (100%). In FIG. 1A, the horizontal axis shows time, and the vertical axis shows relative positions of sampling positions of the line sensors and an original document. Reference letters LR, LG and LB respectively show positions accompanying an elapse of time of sampling positions of the line sensors for a red component, a green component and a blue component. Each of the line sensors carries out a sampling in accordance with a clock supplied at a cycle T. Specifically, during the cycle T, light is accumulated and an integrated value is output.

In case a line gap is L and a transferring speed at a magnification of 100% is V0, a distance in which the sampling position of the line sensor transfers during the cycle T is V0T. In this case, V0T corresponds to an interval P of photoelectric elements arranged in a main scanning direction of the line sensor. That is, at 100% magnification, each of the line sensors can scan a square region where a length of one side corresponds with P. Each of the line sensors is arranged so that the line gap L becomes a natural number of times that of the interval P of the photoelectric elements. In case the natural number is m0, $$L = m0 V0 T \tag{Equation 1}$$

As described above, the line gap L is expressed by using the distance in which the sampling position of the line sensor transfers per one cycle at 100% magnification.

In FIG. 1A, the line gap L of each of the line sensors is the length P of the photoelectric elements. That is, m0=1 and L=V0T. When scanning an original document at 100% magnification, the sampling position of each of the line sensors transfers at a speed to advance one line during the time SH which is the cycle T. Accordingly, each of the line sensors can scan the same line on the original document. In FIG. 1A, a line scanned by the line sensor for the red component is scanned by the line sensor for the green component after the time SH, and scanned by the line sensor for the blue component after the time 2·SH. Therefore, by composing an output value of the line sensor for the blue component, an output value of the line sensor for the red component from two previous cycles and an output value of the line sensor for the green component from one previous cycle, pixel data of an RGB format can be acquired for the same line. That is, according to the line gap, the output values from at least two line sensors can be accumulated temporarily, and by composing the output values with a delay, the pixel data of the RGB format can be acquired for the same line. The above-described correction process will be referred to as a "delay process". A position on the original document where each of the line sensors has carried out a sampling will be referred to as a "sampling position". For carrying out the delay process, the color image processing device includes a buffer. The size of the buffer will be described later in detail.

FIG. 1B is a graph showing a relationship between sampling positions and sampling timings of each of the line sensors when scanning an original document at a rate of magnification of 125%. Reference letters LR, LG and LB respectively show relationships between the sampling positions and the sampling timings of each of the line sensors when carrying out the samplings for 1.25 times the number of the samplings carried out in FIG. 1A for a prescribed range on the original document. That is, by reducing the transferring speeds of the sampling positions of each of the line sensors to be slower than the transferring speed of FIG. 1A, the sampling is carried out for 1.25 times more in the prescribed range on the original document. In this case, with respect to a sampling position PR of the line sensor for the red component, a sampling position of the line sensor for the green component is located at a sampling position PG and a sampling position of the line sensor for the blue component is located at a sampling position PB. Each of the sampling positions PR, PG and PB is located at different positions from one another. Such a scanning process will be referred to as a "speed preference mode".

In such a case where the sampling positions are located at different positions from one another, to make a correspondence between the sampling positions of each of the line sensors with one another, the sampling timings may be controlled for each of the line sensors. However, in this case, a circuit for supplying a clock becomes necessary for each of the line sensors. As a result, the device becomes expensive. The line sensors determine a period of time for accumulating light necessary for carrying out the sampling in accordance with sensitivity and light intensity projected on the original document. Therefore, a minimum value of the sampling cycle depends on the period of time for accumulating light on a specification of the line sensors.

In the first embodiment, by slowing the transferring speeds of the sampling positions of each of the line sensors, the sampling is carried out for a plural number of times in a range of the original document where the sampling is carried out generally just once. From the plurality of sampling positions, a sampling position located closest to a regular position (the sampling position of the color component to be the standard) is selected and composed. That is, under the speed preference mode, in case the transferring speed corresponding to the rate of magnification is V and the number of samplings, i.e., the division number is S, the speed is adjusted so that the scanning process is carried out under a line width of:

$$VT/S \; (S=1, 2, 3 \ldots)$$

That is, the sampling positions of the line sensors transfer at the speed of V/S.

For example, when scanning a line width that is generally scanned by one sampling by carrying out the sampling for three times, the sampling positions of the line sensors transfer over a period of time that is three times longer. Reference letters LR', LG' and LB' respectively show a relationship between the sampling positions and the sampling timings of each of the line sensors when the sampling positions of the line sensors transfer over a period of time that is three times longer. For example, when comparing LR and LR', LR transfers one line during a period from time t0 to time t1, and LR' transfers the same distance during a period from the time t0 to time t3 which is three times longer. During this period, LR' carries out the sampling for three times. That is, LR' scans a width of one line for LR by dividing the line into three lines.

For example, when composing pixel data at a position "0", "PR" is selected as the red component, "PG2" that is located close to the position "0" is selected as the green component from "PG1, PG2 and PG3" and "PB2 or PB3" is selected as the blue component from "PB1, PB2 and PB3". Specifically, in case the speed at 100% magnification is 1, the speed at the rate of magnification of 125% becomes 4/5. Therefore, by using the time t, a position y of LB' becomes:

$$y = t \cdot 4/15 - 2 \tag{Equation 2}$$

From Equation 2, PB1 becomes y=6·4/15−2=−6/15. In the same manner, PB2 becomes y=−2/15 and PB3 becomes y=2/15. Therefore, PB2 or PB3 is selected. As described above, in accordance with the distance calculated theoretically, any one of the three values can be selected. Alternatively, according to a relationship of the timings between the cycle T and a transferring unit, the value having a smaller gap generated by an inconsistency in the actual paper feeding amount and the clock can be selected.

Accordingly, although a period of time necessary for one scanning process becomes long, an image with a high image quality can be obtained without changing the clock. Such a scanning process will be referred to as an "image quality preference mode". That is, under the image quality preference mode, a line width scanned by one sampling under the speed preference mode is scanned by a plurality of samplings to realize high image quality.

FIG. 2 schematically shows the speed preference mode and the image quality preference mode described in FIG. 1B. Under the speed preference mode, the sampling positions transfer a prescribed distance at a constant speed during one cycle and acquire one scanning data from each of the line sensors. Meanwhile, under the image quality preference mode, the sampling positions transfer a distance in which the sampling positions transfer during one cycle under the speed preference mode at a constant speed during three cycles, and acquire three scanning data from each of the line sensors. Then, from the three scanning data, one scanning data of the sampling position located close to the sampling position of the standard line sensor is selected. Accordingly, deterioration in the image quality due to a difference in the sampling positions can be prevented. Such a correction will be referred to as a "gap process" with respect to the above-described "delay process".

Figure 3A:
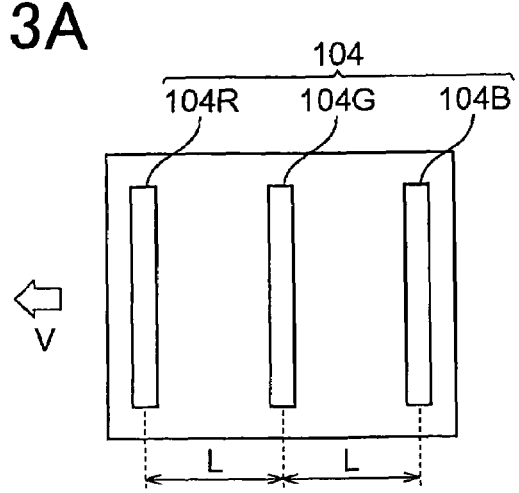
FIG. 3A shows a layout of the line sensors for scanning an original document.

FIG. 3A shows a layout of the line sensors for scanning an original document. A first line sensor 104R for a red component, a second line sensor 104G for a green component and a third line sensor 104B for a blue component (hereinafter collectively referred to as "line sensors 104") are respectively disposed in parallel with the main scanning direction at an equal interval between one another. In the first embodiment, each of the line sensors 104 is disposed at a line gap L. Each of the line sensors 104 outputs a pixel value for each of the components at a constant sampling cycle. An original document can be scanned by the line sensors 104 scanning on the original document at a prescribed speed or by the sampling positions of the line sensors 104 scanning on the original document at a prescribed speed.

Figure 3B:
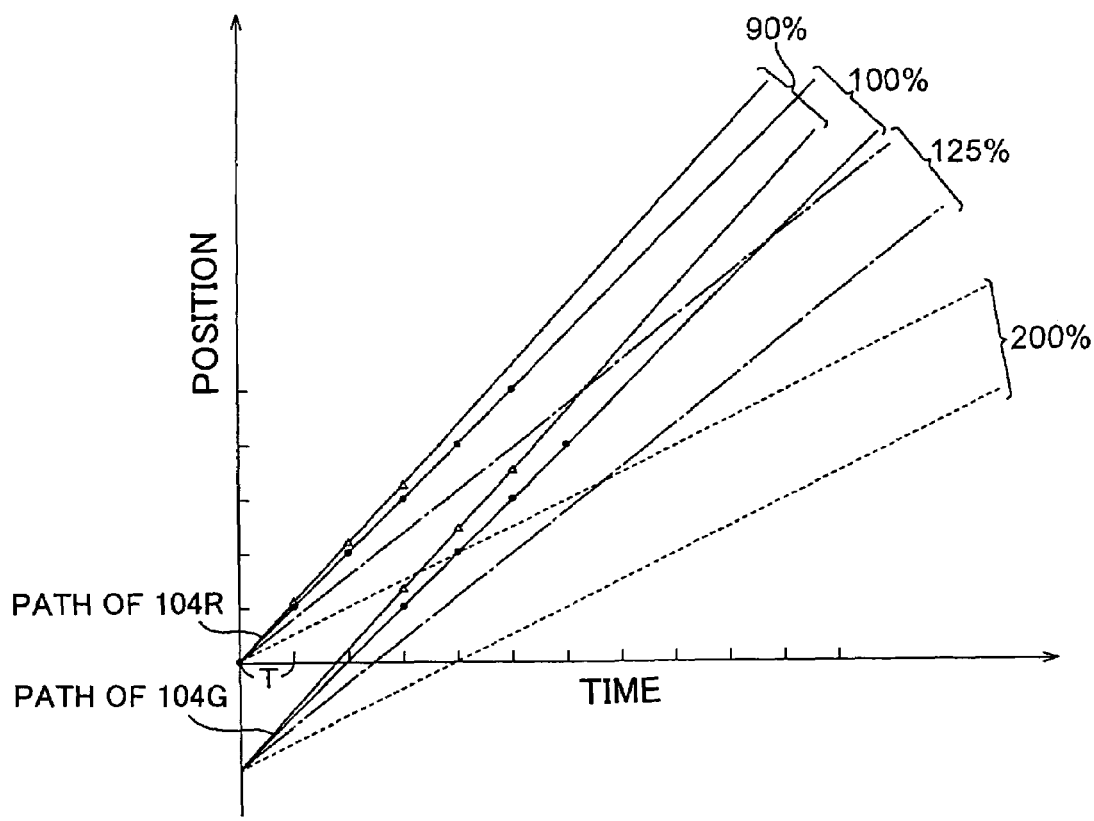
FIG. 3B is a graph showing paths of the sampling positions of the line sensors for each rate of magnification for scanning an original document.

FIG. 3B is a graph showing paths of the sampling positions of the line sensors for each rate of magnification for scanning an original document. In FIG. 3B, the horizontal axis is time, and the vertical axis is a position on the original document of the sampling positions of the line sensors. FIG. 3B shows paths of the sampling positions of the first line sensor 104R and the second line sensor 104G when the rate of magnification is 90%, 100%, 125% and 200%. The sampling positions of each of the line sensors 104 transfer at a constant speed determined according to the rate of magnification, and the sampling is carried out at a constant sampling cycle T. Therefore, by increasing the transferring speed, the line sensors 104 can scan an original document at a reduction. By reducing the transferring speed, the line sensors 104 can scan an original document at an enlargement.

In FIG. 3B, the line gap between the first line sensor 104R and the second line sensors 104G is four lines. When scanning an original document at a rate of magnification of 100%, the sampling positions of each of the line sensors 104 transfer at a speed to advance one line during the sampling cycle T. Therefore, the line sampled by the first line sensor 104R is sampled by the second line sensor 104G after an elapse of time 4T. By controlling the speed in such a manner, each of the line sensors can scan the same line on the original document. Therefore, by composing a pixel value output by the third line sensor 104B, a pixel value output by the second line sensor 104G at four previous cycles and a pixel value output by the first line sensor 104R at eight previous cycles, the image data of the RGB format can be obtained for the same line. That is, according to the line gap, by temporarily accumulating the output values from at least two line sensors and composing the output values with a delay, the pixel data of the RGB format can be obtained for the same line. The pixel value output by each of the line sensors 104 will be referred to as "single color pixel data". The pixel value of the RGB format, which is a collection of the single color pixel data, will be referred to as "RGB pixel data".

To carry out the delay process, a buffer is necessary for accumulating the single color pixel data for each of the scanned lines. For example, in case of enabling the scanning process up to the rate of magnification of 400%, a buffer size MR of a buffer for the first line sensor 104R is MR=8*4=32 lines and a buffer size MG of a buffer for the second line sensor 104G is MG=4*4=16 lines. With the division number 3, in case of carrying out the gap process up to the rate of magnification of 400%, the buffer size is necessary to be MR=8*4*3=96 lines and MG=4*4*3=48 lines. As the buffer size increases, the cost of the device increases.

Meanwhile, as shown in FIG. 3B, the distance in which the line sensors 104 transfer during the cycle T increases as the scanning rate of magnification decreases. Therefore, a gap amount at an enlargement or a reduction becomes large as the rate of magnification becomes low, and becomes small as the rate of magnification becomes high. The inventor shave paid attention to this point. To use a limited capacity of the buffer efficiently, at a rate of magnification that is lower than a prescribed rate of magnification, the scanning process is carried out under the image quality preference mode, and at a rate of magnification that is the prescribed rate of magnification or higher, the scanning process is carried out under the speed preference mode.

In case a number of lines at 100% magnification is m0, a number of lines m at a magnification ratio of x is:

$$m = x \cdot m0 \quad \text{(Equation 3)}$$

In case a division number under the image quality preference mode is S, the number of lines becomes S times Equation 3. Therefore, a condition of the division number S under the image quality preference mode which can be accumulated in the buffer M is:

$$M \geq S \cdot m = S \cdot x \cdot m0 \quad \text{(Equation 4)}$$

Thus:

$$S \geq M/(x \cdot m0)$$

Accordingly, a natural number that satisfies Equation 4 can be recognized to be the division number S. From Equation 1, $$m0 = L/(V0 \cdot T) \quad \text{(Equation 5)}$$

For example, in case the division number S is 3, the rate of magnification x, which is a threshold value for switching between the image quality preference mode and the speed preference mode, is shown by the following equation. In case L=4 and a maximum rate of magnification is 400% and V0T=1 and S=3; from Equation 4 and Equation 5:

$$x \leq M/(S \cdot L/V0T) = 4/3 \quad \text{(Equation 6)}$$

Accordingly, at a rate of magnification that is lower than 4/3 times, the scanning process is carried out under the image quality preference mode. At a rate of magnification that is 4/3 times or higher, the scanning process is carried out under the speed preference mode. As a result, the buffer can be used efficiently. As another example, at a rate of magnification that is 4/3 times or lower, the scanning process is carried out under the image quality preference mode. At a rate of magnification that is higher than 4/3 times, the scanning process can be carried out under the speed preference mode.

Figure 4:
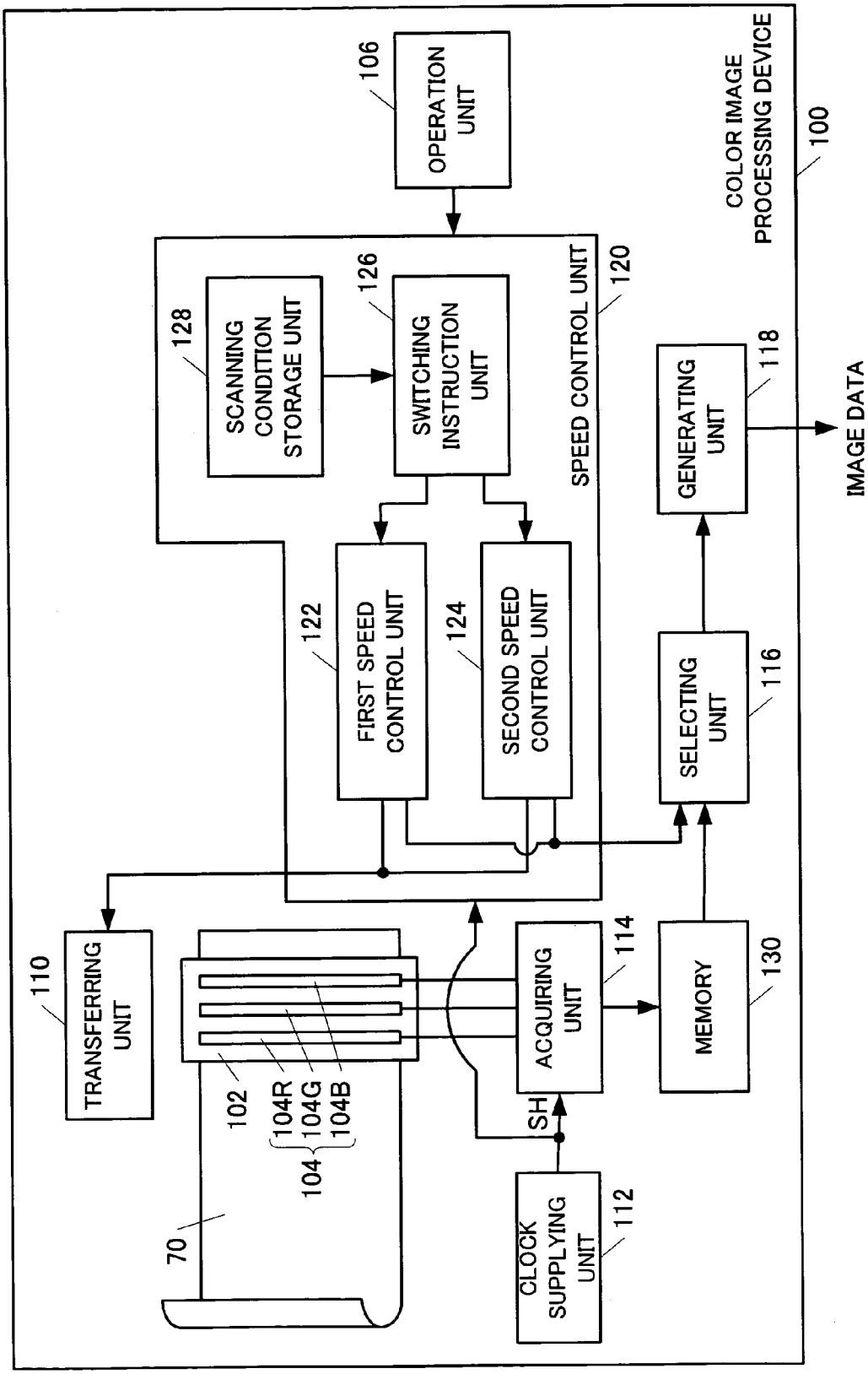
FIG. 4 is a block diagram showing an inner configuration of a color image processing device according to first and second embodiments of the present invention.

FIG. 4 is a block diagram showing an inner configuration of a color image processing device 100 according to the first embodiment of the present invention. Although details will be described later, the color image processing device 100 is an example of a structure for carrying out the above-described processes. With the rate of magnification stored in a scanning condition storage unit 128 as a threshold value, when the designated rate of magnification is higher than the threshold value, the scanning process is carried out under the speed preference mode. When the designated rate of magnification is lower than the threshold value, the scanning process is carried out under the image quality preference mode.

A scanning unit 102 includes the first line sensor 104R for scanning the red component included in an original document 70, the second line sensor 104G for scanning the green component and the third line sensor 104B for scanning the blue component. Each of the line sensors 104 is provided in parallel with the main scanning direction, respectively. Each of the line sensors 104 can be provided at an equal interval between one another or can be provided at any interval. In the first embodiment, the line sensors 104 are provided at an equal interval between one another.

A transferring unit 110 relatively transfers the original document 70 and the scanning unit 102 (the sampling positions of the line sensors 104). For example, the scanning unit 102 can be transferred with respect to the fixed original document 70, or the original document 70 can be transferred with respect to the fixed scanning unit 102. The transferring unit 110 adjusts a relative transferring speed of the scanning unit 102 with respect to the original document 70 according to an instruction from a speed control unit 120.

In accordance with a clock supplied from a clock supplying unit 112, an acquiring unit 114 acquires voltage values from the first line sensor 104R, the second line sensor 104G and the third line sensor 104B. The acquiring unit 114 converts the voltage values acquired from each of the line sensors 104 into digital values. Then, the acquiring unit 114 temporarily accumulates the digital values in a memory 130 as the pixel data for each line. That is, the acquiring unit 114 accumulates the pixel data for each of the color components (hereinafter referred to as "single color pixel data") for a prescribed number of lines for each of the scanned lines of the original document 70.

As a buffer for at least two of the line sensors 104, the memory 130 has a capacity for accumulating the single color pixel data for a prescribed number of lines. For example, in case the line gap of each of the line sensors 104 is L and a maximum rate of magnification is Amax %, a memory capacity MR for the first line sensor 104R and a memory capacity MG for the second line sensor 104G are respectively:

$$MR = 2L \cdot A\max$$

$$MG = L \cdot A\max$$

In case L=4 and Amax=400%, MR=2·4·4=32 and MG=4·4=16. This memory capacity enables the scanning process up to Amax under the speed preference mode. The speed control unit 120 controls the transferring unit 110 so that the limited memory capacity is used efficiently.

An operation unit 106 implements a user interface by a touch panel, buttons, a display panel or the like. For example, the operation unit 106 receives from the user, a designation of a scanning rate of magnification for scanning the original document 70. Then, the operation unit 106 outputs the received instruction to the speed control unit 120. The speed control unit 120 controls a transferring speed of the transferring unit 110 in accordance with the instruction.

The speed control unit 120 includes a first speed control unit 122, a second speed control unit 124, a switching instruction unit 126 and a scanning condition storage unit 128. The first speed control unit 122 controls the transferring unit 110 under the image quality preference mode in which the image quality is prioritized. The second speed control unit 124 controls the transferring unit 110 under the speed preference mode in which a scanning speed of the original document is prioritized.

The scanning condition storage unit 128 stores the prescribed rate of magnification calculated in Equation 6, which is to be the threshold value. The switching instruction unit 126 compares the rate of magnification received from the user via the operation unit 106 and the threshold value stored in the scanning condition storage unit 128, and switches the control to the first speed control unit 122 or the second speed control unit 124. When the received rate of magnification is lower than the threshold value, the switching instruction unit 126 instructs the first speed control unit 122 to control the transferring unit 110 under the image quality preference mode. When the received rate of magnification is the threshold value or higher, the switching instruction unit 126 instructs the second speed control unit 124 to control the transferring unit 110 under the speed preference mode.

The second speed control unit 124 controls the transferring speed of the transferring unit 110 so that the scanning process is carried out under the speed preference mode. That is, the second speed control unit 124 controls the transferring unit 110 so that a relative distance between the scanning unit 102 and the original document becomes one line within one sampling cycle.

The first speed control unit 122 controls the transferring speed of the transferring unit 110 so that the scanning process is carried out under the image quality preference mode. That is, the first speed control unit 122 controls the transferring unit 110 so that the relative distance between the scanning unit 102 and the original document becomes one line within a plurality of sampling cycles. By reducing the speed, the number of the sampling positions increases and the image quality improves. However, the necessary capacity of the memory 130 also increases. Therefore, in the first embodiment, the color image processing device 100 is formed to be switched automatically between the image quality preference mode and the speed preference mode so that the memory 130 is used efficiently.

To form image data, a selecting unit 116 loads the single color pixel data of each of the color components of the same line from the memory 130 and outputs the loaded single color pixel data to a generating unit 118. When the second speed control unit 124 is controlling the transferring unit 110, the selecting unit 116 selects the single color pixel data in accordance with the delay process. When the first speed control unit 122 is controlling the transferring unit 110, the selecting unit 116 selects the single color pixel data in accordance with the delay process and the gap process.

The generating unit 118 composes the single color pixel data of the same line supplied from the selecting unit 116 and generates RGB pixel data of the RGB format. Then, by sequentially composing the RGB pixel data of all of the lines supplied from the selecting unit 116, the generating unit 118 generates image data. As described above, according to the memory capacity of the memory 130, the rate of magnification, which is to be the threshold value, is calculated. With the threshold value as a boundary, the mode is switched between the image quality preference mode and the speed preference mode. Accordingly, the correction process can be carried out efficiently according to the transferring speed of the scanning unit 102 with respect to the original document 70.

Second Embodiment

From an aspect of efficiently using the memory 130 having a limited capacity, in the first embodiment, the threshold value is set and the mode is switched between the image quality preference mode and the speed preference mode. In a second embodiment, the memory 130 is used efficiently by dynamically determining a division number in the image quality preference mode according to a designated rate of magnification. A structure for implementing the second embodiment is approximately the same as the structure of the color image processing device 100 of FIG. 4. In the second embodiment, the functions of the switching instruction unit 126 and the scanning condition storage unit 128 are different from the first embodiment. In the following, a concept of the second embodiment will be described and also, the functions of the switching instruction unit 126 and the scanning condition storage unit 128 for implementing the concept will be described.

In case a line gap is L and a maximum rate of magnification is 400% and V0T=1 and a designated rate of magnification is x and a number of lines that can be accumulated in the buffer is M, a number of lines to be delayed will be calculated. The number of lines after being divided is L·x·S. This number of lines shall not exceed the number of lines M that can be accumulated in the buffer. Therefore, the following relationship is necessary:

$$L \cdot x \cdot S \leq M$$

Therefore, a division number S at the image quality preference mode is necessary to satisfy the following equation:

$$S \leq M/L \cdot x \quad \text{(Equation 7)}$$

A gap between the line sensors is eight lines between the line sensors R-B, and four lines between the line sensors G-B. Therefore, L=8 between the line sensors R-B, and L=4 between the line sensors G-B. In case the maximum rate of magnification is 400%, the number of lines to be accumulated is 32 lines for the line sensor R and 16 lines for the line sensor G. Each of the number of the lines is the number of lines M of each of the line sensors. Therefore, for the designated rate of magnification x, the division number is shown in the following examples:

When x=1,
  between the line sensors R-B: $S \leq 32/(8*1)=4$
  between the line sensors G-B: $S \leq 16/(4*1)=4$ Therefore, S=4

When x=0.36,
  between the line sensors R-B: $S \leq 32/(8*0.36)=11.11$
  between the line sensors G-B: $S \leq 16/(4*0.36)=11.11$ Therefore, S=11

When x=3.6,
  between the line sensors R-B: $S \leq 32/(8*3.6)=1.1$
  between the line sensors G-B: $S \leq 16/(4/3.6)=1.1$ Therefore, S=1

Accordingly, for example, when the designated rate of magnification is 36%, the maximum division number in the image quality preference mode is 11. Under the image quality preference mode, the gap amount does not necessarily become small when the division number is increased. Even when the division number is small, there is a combination of a rate of magnification and a division number which results in a small gap amount. Therefore, with the division number calculated in Equation 7 as a maximum division number, the scanning process is carried out with the division number which results in a minimum gap amount.

Next, a description will be made of a division number which results in a minimum gap amount, and a method for specifying single color pixel data so that the gap amount becomes minimum when the scanning process is carried out by the division number which results in the minimum gap amount. That is, for example, referring to FIG. 1A and FIG. 1B, a description will be made of a method for specifying single color pixel data which results in the minimum gap amount among PB1, PB2 and PB3 which are obtained by dividing one scanning cycle TS into three.

When the scanning rate of magnification is x, the line gap is L, a delayed line amount is d and a number of the scanning process is i, in case a distance of one line at 100% magnification is 1, a distance at the magnification ratio x becomes 1/x. Accordingly, a scanning position of an i-th scanning process of the first line sensor 104R becomes:

$$i/x \quad \text{(Equation 8)}$$

A scanning position of the second line sensor 104G in proximity with the position i/x expressed in Equation 8 becomes:

$$(i+d)/x - L \quad \text{(Equation 9)}$$

Therefore, from Equation 8 and Equation 9, a difference in the scanning positions of the first line sensor 104R and the second line sensor 104G becomes:

$$i/x - ((i+d)/x - L) = L - d/x \quad \text{(Equation 10)}$$

In case the division number in the image quality preference mode is S and an order in the scanning processes to be selected for the gap process among the single color pixel data acquired by dividing a width of one line in the speed preference mode by the division number S is Z, a distance to be corrected becomes:

$$Z/(x \cdot S) \quad \text{(Equation 11)}$$

From Equation 10 and Equation 11, a distance at the gap process becomes:

$$L - (d - Z/S)/x \quad \text{(Equation 12)}$$

By selecting a combination of the division number S and the scanning order Z which minimizes an absolute value of the equation 12, the single color pixel data which results in a minimum gap amount in the image quality preference mode can be specified. The scanning condition storage unit 128 of FIG. 4 stores by associating with the rate of magnification x, the combination of the division number S and the scanning order Z calculated by using Equation 12. Then, the switching instruction unit 126 loads from the scanning condition storage unit 128, the division number S and the scanning order Z corresponding to the received rate of magnification x. Subsequently, the switching instruction unit 126 instructs the first speed control unit 122 to carry out the above-described control process. As another example, each time when the switching instruction unit 126 of FIG. 4 receives the rate of magnification from the user, the switching instructing unit 126 can calculate the division number S and the scanning order Z and make an instruction to the first speed control unit 123.

Next, a method for determining the delayed line amount d will be described. The delayed line amount d can be determined so that the distance at the gap process obtained by Equation 12 becomes minimum at 0 or greater. Alternatively, the delayed line amount d can be determined so that an absolute value of the distance at the gap process obtained by Equation 12 becomes minimum. However, a maximum value of the delayed line amount d is restricted to an amount capable of being stored in a delay memory. According to the former, the amount of lines to be delayed becomes small compared with the latter.

For example, in case L=4 and x=0.7, when Equation 10 is calculated by d=2 and d=3, the calculated results are as follows:

when d=2, equation 10≈1.1 when d=3, equation 10≈0.3

In this case, according to the determining method of the former, d=2. According to the determining method of the latter, d=3.

An embodiment of the present invention has been described. The above-described embodiment is an example. It is to be understood by those skilled in the art that there are various variations to the combinations of each of the constituent elements and each of the processes and those variations also fall within the scope of the present invention.

Third Embodiment

A third embodiment of the present invention will be described. In the third embodiment, the structure relating to FIG. 1A through FIG. 3B is the same as the first and the second embodiments and the description will be omitted. In the third embodiment, when scanning an original document at an enlargement or a reduction, the above-described speed preference mode and the image quality preference mode can be switched according to an instruction of the user. In the following, the speed preference mode and the image quality preference mode will be collectively referred to as a "scanning mode".

Figure 5:
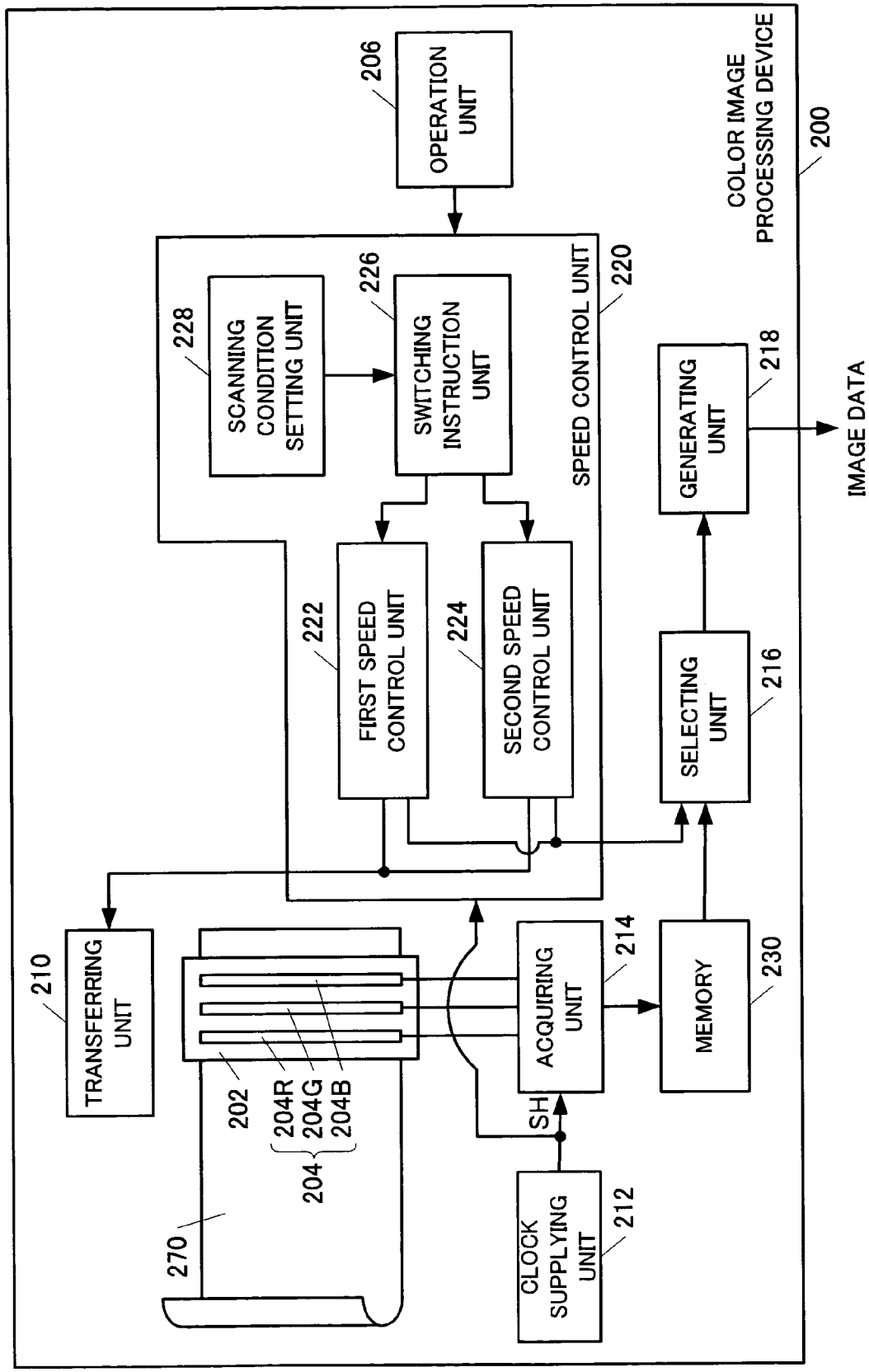
FIG. 5 is a block diagram showing an inner configuration of a color image processing device according to a third embodiment of the present invention.
Figure 6:
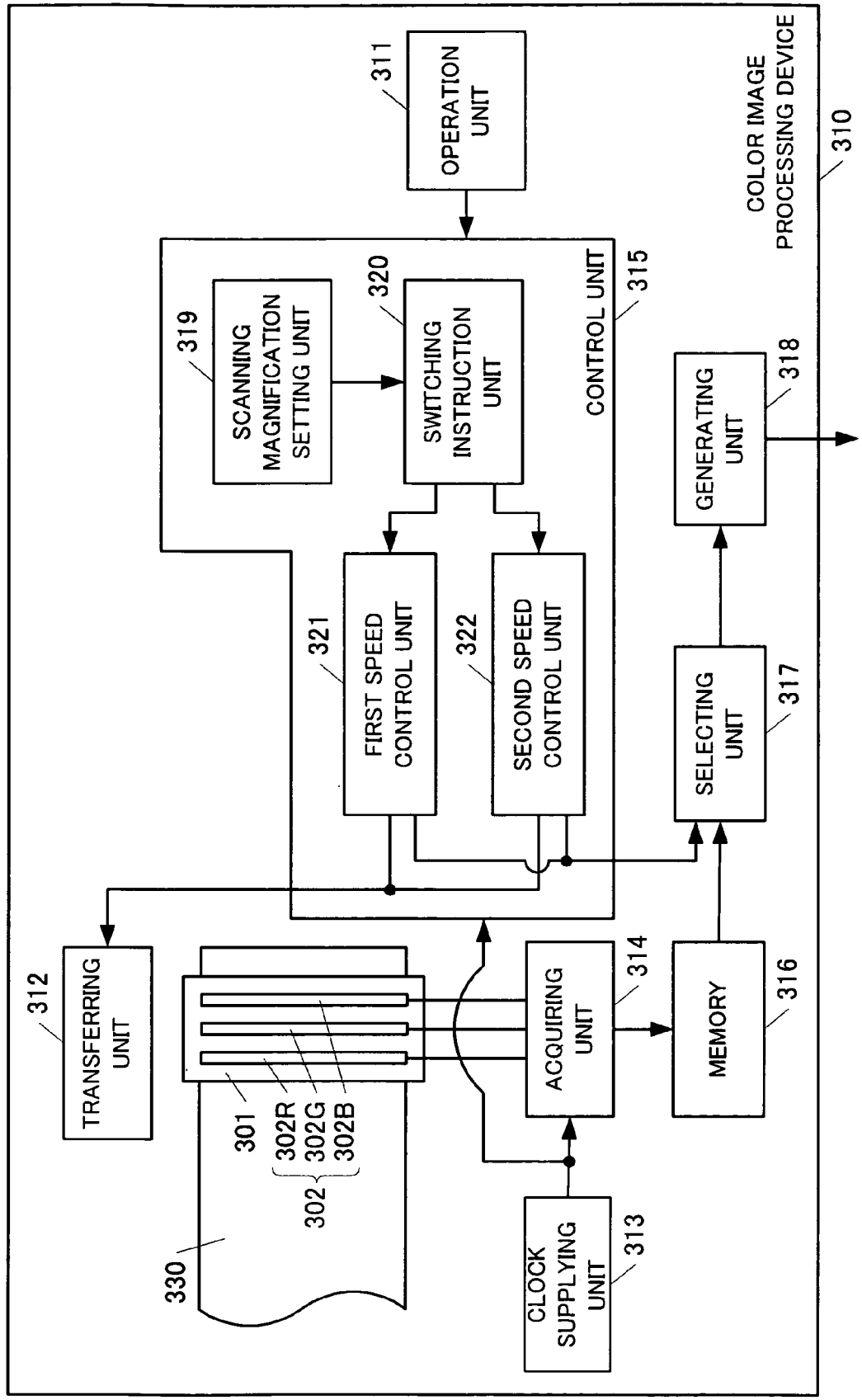
FIG. 6 is a block diagram showing a configuration of a color image processing device according to a fourth embodiment of the present invention.

FIG. 5 is a block diagram showing an inner configuration of a color image processing device 200 according to the third embodiment. A scanning unit 202 includes a first line sensor 204R for scanning a red component included in an original document 270, a second line sensor 204G for scanning a green component and a third line sensor 204B for scanning a blue component. The first line sensor 204R, the second line sensor 204G and the third line sensor 204B (hereinafter referred to as the "line sensors 204") are provided in parallel to a main scanning direction, respectively. Each of the line sensors 204 can be provided at an equal interval between one another or can be provided at any interval. In the third embodiment, the line sensors 204 are provided at an equal interval between one another.

A transferring unit 210 relatively transfers the original document 270 and the scanning unit 202 (the sampling positions of the line sensors 204). For example, the transferring unit 210 can transfer the scanning unit 202 with respect to the fixed original document 270. Alternatively, the transferring unit 210 can transfer the original document 270 with respect to the fixed scanning unit 202. According to an instruction from a speed control unit 220, the transferring unit 210 adjusts a relative transferring speed of the scanning unit 202 with respect to the original document 270.

In accordance with a clock supplied from a clock supplying unit 212, an acquiring unit 214 acquires voltage values from the first line sensor 204R, the second line sensor 204G and the third line sensor 204B. The acquiring unit 214 converts the voltage values acquired from each of the line sensors 204 into digital values. Then, the acquiring unit 214 temporarily accumulates the digital values in a memory 230 as pixel data for each line. That is, the acquiring unit 214 accumulates the pixel data for each of the color components (hereinafter simply referred to as "single color pixel data") for a prescribed number of lines for each of the scanned lines of the original document.

An operation unit 206 implements a user interface by a touch panel, buttons, a display panel or the like and receives various instructions from the user. The operation unit 206 receives the speed preference mode or the image quality preference mode as the scanning mode. In addition, the operation unit 206 receives a rate of magnification, a resolution and a designation of color or monochrome or the like from the user. Then, the operation unit 206 outputs the instructions to the speed control unit 220. According to the instructions, the speed control unit 220 controls the transferring speed of the transferring unit 210.

The speed control unit 220 includes a first speed control unit 222, a second speed control unit 224, a switching instruction unit 226 and a scanning condition setting unit 228. The second speed control unit 224 controls the transferring unit 210 under the speed preference mode (second mode) in which a scanning speed of the original document is prioritized. The first speed control unit 222 controls the transferring unit 210 under the image quality preference mode (first mode) in which an image quality is prioritized. According to the instruction received from the user via the operation unit 206, the switching instruction unit 226 switches the control process to the first speed control unit 222 or the second speed control unit 224. For example, when the speed preference mode is instructed, the switching instruction unit 226 instructs the second speed control unit 224 to carry out the control process. When the image quality preference mode is instructed, the switching instruction unit 226 instructs the first speed control unit 222 to carry out the control process. Accordingly, according to the intentions of the user, the mode can be switched between the speed preference mode and the image quality preference mode. Therefore, according to an object of the usage, the user can select an appropriate scanning mode.

The switching instruction unit 226 can hold the scanning mode used in a previous scanning process as a default mode. If there is no instruction from the user to change the scanning mode, the switching instruction unit 226 can instruct the first speed control unit 222 or the second speed control unit 224 to control the speed by the default mode. Moreover, as a preference mode, the switching instruction unit 226 can receive the speed preference mode or the image quality preference mode from the user via the operation unit 206 in advance. Then, if there is no instruction from the user to change the scanning mode, the switching instruction unit 226 can instruct the first speed control unit 222 or the second speed control unit 224 to control the speed by the received preference mode. Accordingly, since the user is not required to designate the scanning mode each time, an operationality of the color image processing device 200 can be improved.

The scanning condition setting unit 228 holds various conditions of the scanning process such as a rate of magnification, a resolution and a designation of color or monochrome or the like, and the scanning mode by associating them to one another. Then, according to a scanning instruction designated by the user, the switching instruction unit 226 can reference the scanning condition setting unit 228 and switch the default mode to the speed preference mode or the image quality preference mode. For example, in case the resolution and the scanning mode are associated with one another as the scanning condition in the scanning condition setting unit 228, the switching instruction unit 226 can switch the default mode according to the resolution designated by the user. That is, according to the scanning instruction designated by the user, the switching instruction unit 226 switches one of the speed preference mode and the image quality preference mode to the default mode. Then, when the user instructs the scanning mode to be switched to the other scanning mode, the scanning mode is switched to the designated other scanning mode.

For example, as the scanning condition, suppose that the scanning condition setting unit 228 holds conditions that when a resolution "300 dpi" is designated, the speed preference mode is to be used, and when a resolution "600 dpi" is designated, the image quality preference mode is to be used. When the resolution "300 dpi" is designated by the user as the scanning instruction, the switching instruction unit 226 references the scanning condition setting unit 228 and switches the speed preference mode to the default mode. That is, in case of a low resolution, the switching instruction unit 226 instructs the second speed control unit 224 to prioritize the scanning speed. In case of a high resolution, the switching instruction unit 226 instructs the first speed control unit 222 to prioritize the image quality. Accordingly, according to the resolution designated by the user, the scanning mode expected to be designated by the user can be set as the default mode in advance. Therefore, the operationality of the color image processing device 200 can be improved. Moreover, as the resolution is lower, the transferring speed of the line sensors becomes faster. As a result, the gap amount increases. Therefore, in case a low resolution is designated, the image quality preference mode can be set as the default mode. In case a high resolution is designated, the speed preference mode can be set as the default mode. As another example, the scanning mode and the resolution can be associated with one another and held as the scanning condition. Then, according to the scanning mode designated by the user, the resolution can be set.

The scanning condition setting unit 228 can hold the rate of magnification and information for designating whether or not the rate of magnification is an enlargement or a reduction by associating them with one another. When the rate of magnification designated by the user is an enlargement or a reduction, the switching instruction unit 226 can switch the image quality preference mode to the default mode. Accordingly, according to the rate of magnification of the scanning process of the original document designated by the user, the scanning mode expected to be instructed by the user can be set as the default mode in advance. Therefore, the operationality of the color image processing device 200 can be improved.

When a color printing operation is designated by the user, the scanning condition setting unit 228 can set the image quality preference mode as the default mode. When a monochrome printing operation is designated by the user, the scanning condition setting unit 228 can set the speed preference mode as the default mode. Then, according to the instruction of the color printing operation or the monochrome printing operation from the user, the switching instruction unit 226 can switch the image quality preference mode or the speed preference mode to the default mode.

When the color printing operation and an enlargement or a reduction are designated by the user, the image quality preference mode can be switched to the default mode. As described above, by setting the scanning condition in advance and automatically switching the default mode according to the scanning instruction from the user, the operationality is improved.

The second speed control unit 224 controls the transferring speed of the transferring unit 210 so that the scanning process is carried out by the speed preference mode. That is, the second speed control unit 224 controls the transferring unit 210 so that a relative transferring distance of the scanning unit 202 and the original document becomes one line within one sampling cycle.

The first speed control unit 222 controls the transferring speed of the transferring unit 210 so that the scanning process is carried out by the image quality preference mode. That is, the first speed control unit 222 controls the transferring unit 210 so that the relative transferring distance of the scanning unit 202 and the original document becomes one line within a plurality of sampling cycles. By reducing the speed, the number of sampling positions increases and the image quality improves. However, a period of time necessary for the scanning process increases. Therefore, the color image processing device 200 of the third embodiment can select one of the first speed control unit 222 and the second speed control unit 224 according to the object of the user.

To form image data, a selecting unit 216 loads the single color pixel data of each of the color components of the same line from the memory 230 and outputs the loaded single color pixel data to a generating unit 218. When the transferring unit 210 is controlled by the second speed control unit 224, the selecting unit 216 selects the single color pixel data in accordance with the delay process. When the transferring unit 210 is controlled by the first speed control unit 222, the selecting unit 216 selects the single color pixel data in accordance with the delay process and the gap process.

The generating unit 218 composes the single color pixel data of the same line supplied from the selecting unit 216 and generates RGB pixel data of the RGB format. Then, by sequentially composing the RGB pixel data of all of the lines supplied from the selecting unit 216, the generating unit 218 generates the image data.

The third embodiment of the present invention has been described. The above-described embodiment is an example. It is to be understood by those skilled in the art that there are various variations to the combinations of each of the constituent elements and each of the processes and those variations also fall within the scope of the present invention.

Fourth Embodiment

A fourth embodiment of the present invention will be described with reference to the drawings. A color image processing device 310 according to the fourth embodiment includes a scanning unit 301, an operation unit 311, a transferring unit 312, a clock supplying unit 313, an acquiring unit 314, a control unit 315, a memory 316, a selecting unit 317 and a generating unit 318.

The scanning unit 301 includes a first line sensor 302R for scanning a red component included in an original document 330, a second line sensor 302G for scanning a green component and a third line sensor 302B for scanning a blue component. The first line sensor 302R, the second line sensor 302G and the third line sensor 302B (hereinafter simply referred to as the "line sensors 302") can be provided at an equal interval between one another or can be provided at any interval. In the fourth embodiment, the line sensors 302 are provided at an equal interval between one another. Each of the line sensors 302R, 302G and 302B are provided in parallel with one another and the direction in which the line sensors 302 are provided corresponds to a sub scanning direction. The line sensors 302 are formed by a plurality of photoelectric conversion elements. The direction in which the photoelectric conversion elements are provided (direction orthogonal to the direction in which the line sensors 302 are provided) corresponds to a main scanning direction. An interval between each of the line sensors 302 is an integral multiple of a width of one of the photoelectric conversion elements in the sub scanning direction and/or a width of one of the photoelectric conversion elements in the main scanning direction.

The operation unit 311 implements a user interface by a touch panel, buttons, a display panel or the like and receives various instructions from the user. For example, the operation unit 311 receives a rate of magnification and a scanning mode. The operation unit 311 includes a mode selecting unit for selecting a general mode (only a second mode) and a correction mode (the mode is switched between a first mode and the second mode). Under the general mode, the gap correction according to the rate of magnification is not carried out in particular. Under the correction mode, the gap correction is carried out. The transferring unit 312 relatively transfers the original document 330 and the scanning unit 301 (the sampling positions of the line sensors 302). For example, the transferring unit 312 can transfer the scanning unit 301 with respect to the fixed original document 330. Alternatively, the transferring unit 312 can transfer the original document 330 with respect to the fixed scanning unit 301. As an example, in case the scanning unit 301 transfers with respect to the original document 330, a carriage having a light source and a mirror can be transferred and with a lens and the line sensors 302 in a standstill state, the scanning process can be carried out. According to the instruction from the speed control unit 315, the transferring unit 312 adjusts the relative transferring speed of the scanning unit 301 with respect to the original document 330.

In accordance with the clock supplied from the clock supplying unit 313, the acquiring unit 314 acquires voltage values from each of the line sensors 302R, 302G and 302B. The acquiring unit 314 converts the voltage values acquired from each of the line sensors 302 into digital values. Then, the acquiring unit 314 temporarily accumulates the digital values in the memory 316 as pixel data for each line. The memory 316 scans the image data for each of the color components (hereinafter referred to as the "single color pixel data") and accumulates the single color pixel data for a prescribed number of lines for each of the lines of the original documents.

The control unit 315 includes a scanning magnification setting unit 319, a switching instruction unit 320, a first speed control unit 321 and a second speed control unit 322. The scanning magnification setting unit 319 sets a scanning rate of magnification of an enlargement, 100% magnification or a reduction input from the operation unit 311. According to the rate of magnification of the general mode or the correction mode set by the operation unit 311 and the scanning magnification setting unit 319, the switching instruction unit 320 switches between the first speed control unit 321 and the second speed control unit 322. The second speed control unit 322 controls the transferring unit 312 so that the transferring unit 312 transfers at a constant speed during three driving cycles, a distance in which the transferring unit 312 transfers during one scanning cycle, and acquires three scanning data from each of the line sensors 302 (first mode). The first speed control unit 321 controls the transferring unit 312 so that the transferring unit 312 transfers a prescribed distance at a constant speed during one scanning cycle, and acquires one scanning data from each of the line sensors 302 (second mode).

To form image data, the selecting unit 317 loads the single color pixel data of each of the color components of the same line from the memory 316 and outputs the loaded single color pixel data to the generating unit 318. When the first speed control unit 321 is controlling the transferring unit 312, the selecting unit 317 selects the single color pixel data in accordance with the delay process. When the second speed control unit 322 is controlling the transferring unit 312, the selecting unit 317 selects the single color pixel data in accordance with the delay process and the gap process.

The generating unit 318 composes the single color pixel data of the same line supplied from the selecting unit 317 and generates RGB pixel data of the RGB format. Then, by sequentially composing the RGB pixel data of all of the lines supplied from the selecting unit 317, the generating unit 318 generates the image data.

Figure 7:
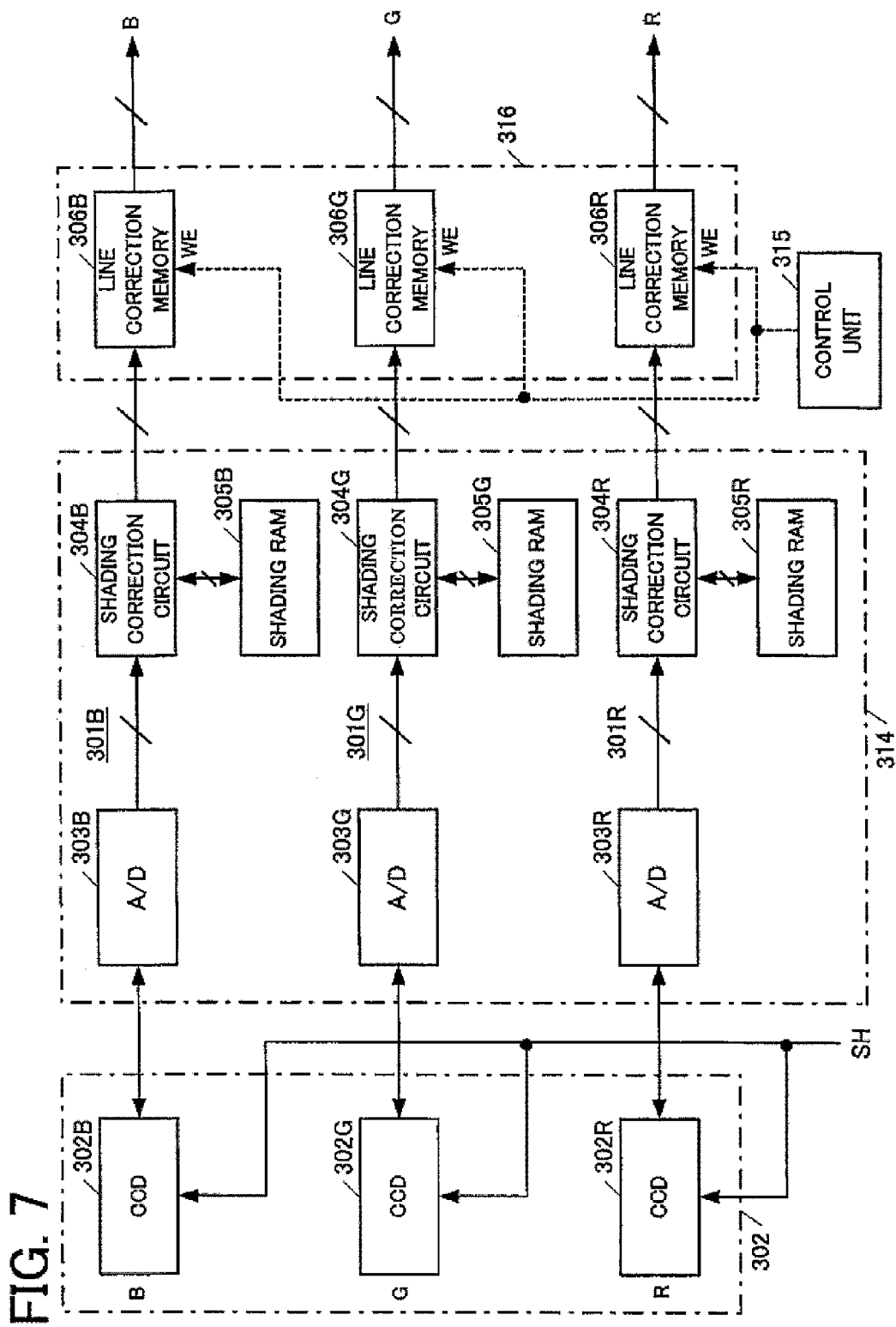
FIG. 7 is a block diagram showing an inner configuration of an acquiring unit and a memory of the color image processing device according to the fourth embodiment of the present invention.

FIG. 7 is a block diagram showing a specific example of a circuit of the line sensor 302, the acquiring unit 314 and the memory 316. Here, suppose that each of the signal processing systems of each of the line sensors 302R, 302G and 302B is an R signal processing unit 301R, a G signal processing unit 301G and a B signal processing unit 301B, respectively. The B signal processing unit 301B includes the line sensor 302B, an Analog-to-Digital (A/D) conversion circuit 303B, a shading correction circuit 304B, a shading Random Access Memory (RAM) 305B and a line correction memory 306B. The G signal processing unit 301G includes the line sensor 302G, an A/D conversion circuit 303G, a shading correction circuit 304G, a shading RAM 305G and a line correction memory 306G. The R signal processing unit 301R also has the same circuit as the B signal processing unit 301B and the G signal processing unit 301G. That is, the R signal processing unit 301R includes a line sensor 302R, an A/D conversion circuit 303R, a shading correction circuit 304R, a shading RAM 305R and a line correction memory 306R.

Figure 8:
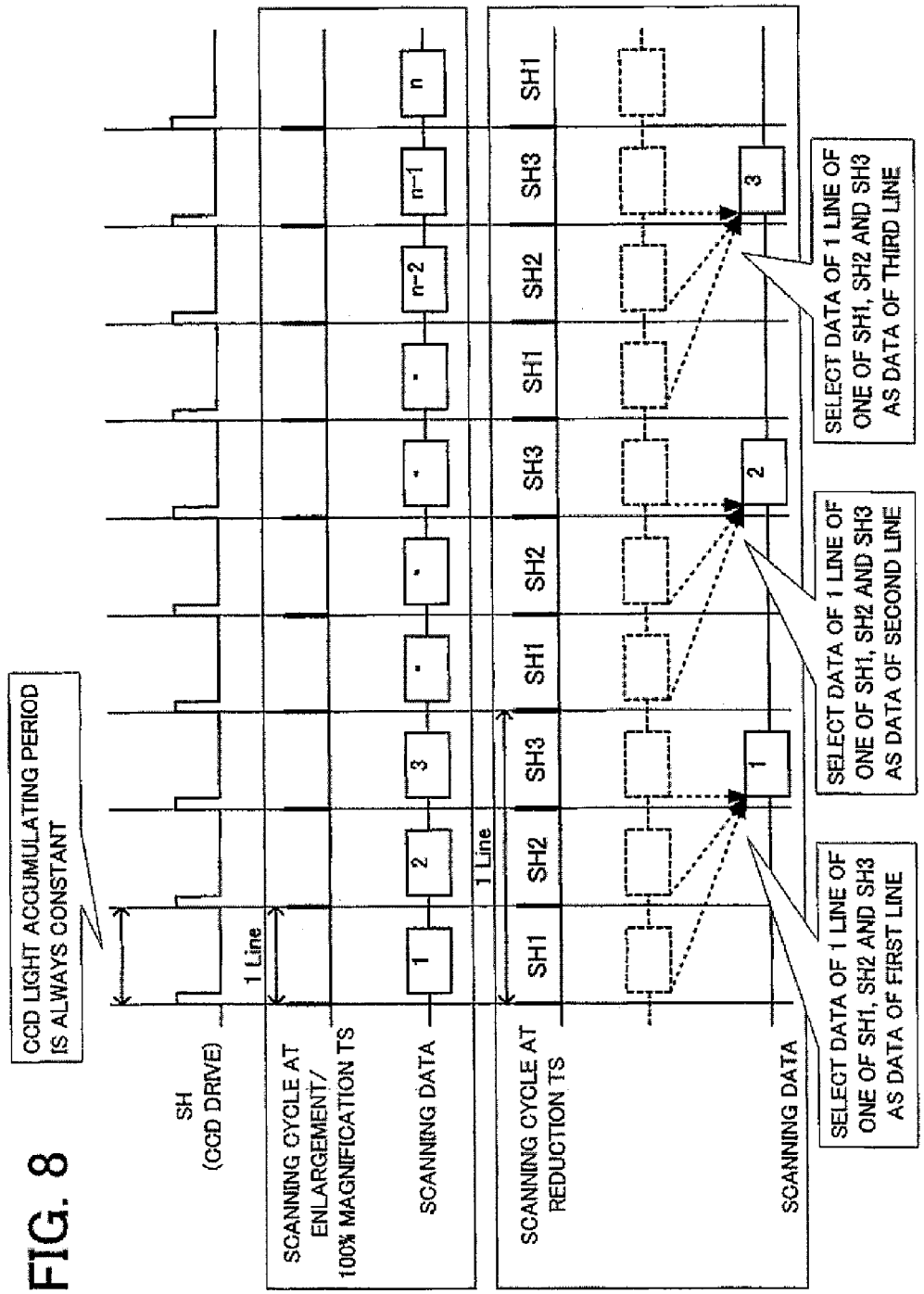
FIG. 8 is a time chart showing scanning timing signals and driving timing signals of the color image scanning device according to the fourth embodiment of the present invention.

For example, the line sensor 302B uses a Charge Coupled Device (CCD) image sensor. A driving signal SH (refer to FIG. 8) of a constant cycle is input to the line sensor 302B. Then, for each one cycle of the driving signal SH, the blue component of one line is scanned by a light accumulating action.

The A/D conversion circuit 303B includes an Analog Front End (AFE) circuit which receives an output of the line sensor 302B and amplifies the output into an analog signal. The A/D conversion circuit 303B converts the amplified analog signal into digital data and outputs the digital data as multi-level data.

For performing a shading correction, the shading RAM 305B stores the output of the A/D conversion circuit 303B when the line sensor 302B scans a white reference and a black reference. In the shading correction circuit 304B, a shading correction is carried out on the output of the A/D conversion circuit 303B at a scanning process of an original document by shading correction data stored in the shading RAM 305B. Then, the shading correction circuit 304B outputs the shading corrected data. The data output from the shading correction circuit 304B is stored into the Line correction memory 306B by a write enable signal WE transmitted from the control unit 315. The line sensors 302G and 302R also use a CCD image sensor or the like in the same manner as the line sensor 302B. In the same manner as the line sensor 302B, the driving signal SH is input to the line sensors 302G and 302R Then, by the light accumulating action, the green component and the red component of one line are scanned. The A/D conversion circuits 303G and 303R, the shading correction circuits 304G and 304R, the shading RAMs 305G and 305R and the line correction memories 306g and 306R have the same circuit as the A/D conversion circuit 303B, the shading correction circuit 304B, the shading RAM 305B and the line correction memory 306B, respectively.

At the general mode and at 100% magnification and an enlargement of the correction mode, the line correction memories 306B, 306G and 306R output the stored data with a delay amount for correcting the line gaps of the line sensors 302B, 302G and 302R (displacements of the line sensors 302 in the sub scanning direction). Meanwhile, at a reduction of the correction mode, the line correction memories 306B, 306G and 306R output the stored data at a timing considering the delay amount for correcting the line gaps of the line sensors 302B, 302G and 302R and the gap in the sub scanning position by the rate of reduction.

At the general mode and at 100% magnification and an enlargement of the correction mode, the control unit 315 provides the driving signal SH to the line sensors 302B, 302G and 302R. In addition, the control unit 315 provides the write enable signal WE according to a timing signal TS to the line correction memories 306B, 306G and 306R. Meanwhile, at a reduction of the correction mode, the control unit 315 provides the driving signal SH to the line sensors 302B, 302G and 302R. In addition, the control unit 315 provides the write enable signal WE to the line correction memories 306B, 306G and 306R during one of the periods SH1, SH2 and SH3. Further, the periods SH1, SH2 and SH3 have been divided into three periods from the scanning cycle TS (three times the driving cycle SH) according to the rate of reduction. The output timings of the write enable signal WE output to the line correction memories 306G and 306R are determined by the control unit 315 in accordance with the rate of magnification.

In the fourth embodiment, either one of the general mode and the correction mode can be selected. Under the general mode, at an enlargement, 100% magnification and a reduction, the line correction memory carries out a correction process for correcting only the line gaps in the sub scanning direction of the line sensors. Meanwhile, under the correction mode, at 100% magnification and an enlargement, the cycle of the scanning timing signal TS is the same as the cycle of the driving signal SH, and the scanning data is stored into the line correction memory at the same cycle as the driving signal SH. On the contrary, under the correction mode, only at a reduction, the cycle of the scanning timing signal TS is three times the cycle of the driving signal SH. According to the rate of reduction, one of the timings is selected from the driving signals SH1, SH2 and SH3, which have been divided into three timings from the scanning cycle TS. The combination of the scanning data of each of the color components selected at this time results in a minimum gap amount between the color components. Then, the selected scanning data is written into the line correction memory (refer to FIG. 8).

Figure 10:
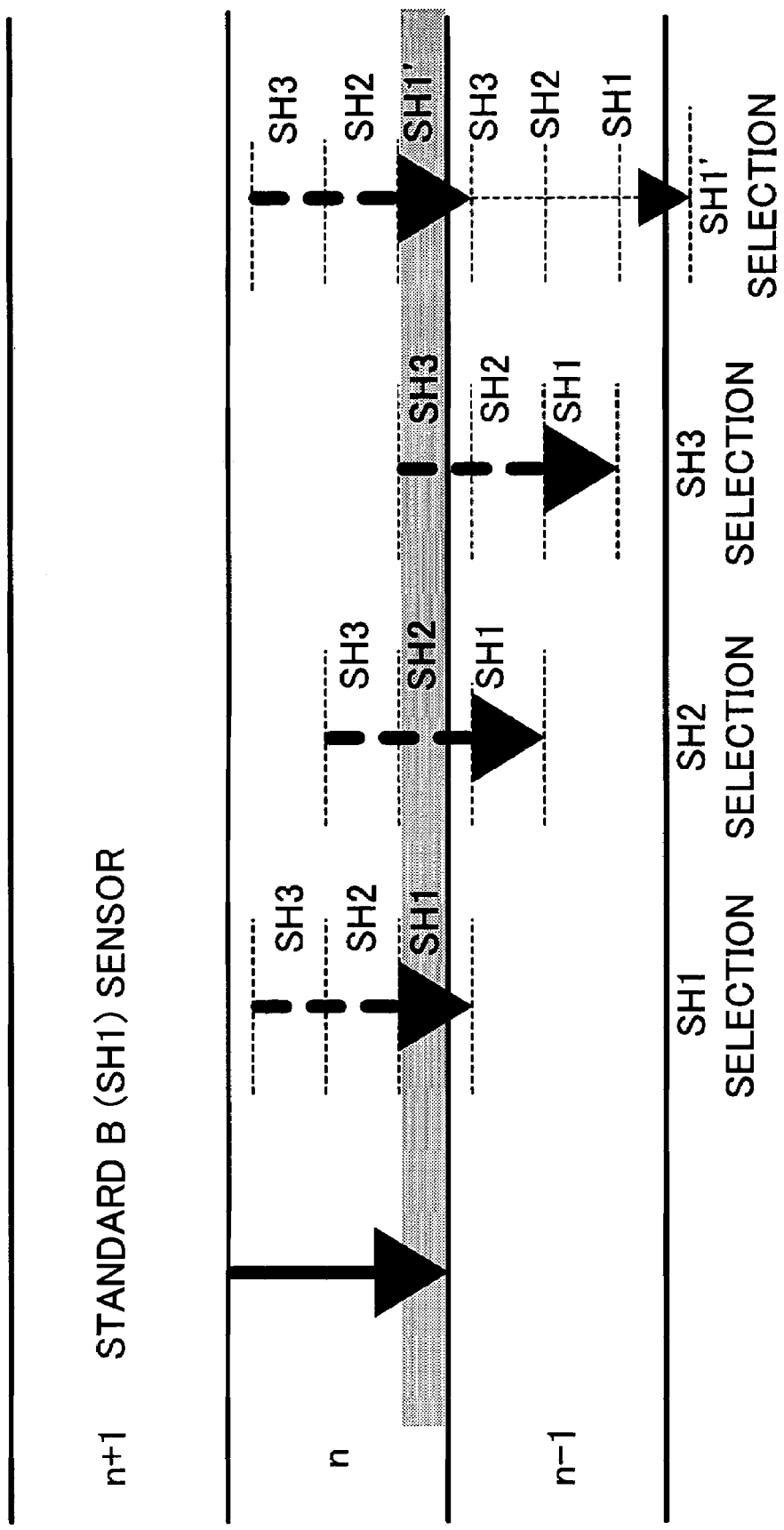
FIG. 10 is a schematic diagram showing a selection of a timing SH in the color image scanning device according to the fourth embodiment of the present invention.

FIG. 10 shows which data among SH1, SH2, SH3 and SH1' of the line sensor 302R or 302G is to be selected as a scanning value with the line sensor 302B as a standard. As shown in FIG. 10, data in which the gap between the color components results in a minimum value is selected.

A line correction and a gap correction of the line sensors 302B, 302G and 302B carried out at a reduction and at 100% magnification and an enlargement under the correction mode in the color image processing device according to the fourth embodiment will be described with reference to FIG. 9.

To carry out the line correction and the sub scanning position correction, first, a number of pixels N*m which increases and decreases by the rate of magnification is calculated by the control unit 315.

N: rate of magnification (=1/transferred distance at enlargement or reduction)

m: =L/P

L: distance between the line sensors (number of gap lines between the line sensors)

P: pixel pitch in the sub scanning direction at 100% magnification (1 line)

When calculating N*m=D.d, a number of delayed lines can be determined from an integral part D, and the timings SH1, SH2, SH3 and SH1' can be determined from a decimal part d.

SH1 is the timing to write data scanned by the line sensor 302B into the line correction memory 306B. With SH1 as the standard, the timing (SH) is determined. Further, the timing (SH) is the timing to write into the line correction memories 306G and 306R, the data scanned by the line sensors 302G and 302R which corresponds to a position the same as a position of an original document scanned by the line sensor 302B.

The timing SH is determined under the following conditions by the decimal part d of the result D.d calculated from N*m.

$0 \leq d < 1/6$                                        SH1

$1/6 \leq d < 3/6$                                  SH2

$3/6 \leq d < 5/6$                                  SH3

$5/6 \leq d < 1$                                      SH1'

A table for calculating N*m and a table for determining the timing SH from the decimal part d are provided in the control unit 315. The control unit 315 calculates N*m=D.d, and a number of delayed lines and the sub scanning position correction (optimum timing SH) according to the rate of magnification of a line image scanner are selected to realize each correction.

Figure 9:
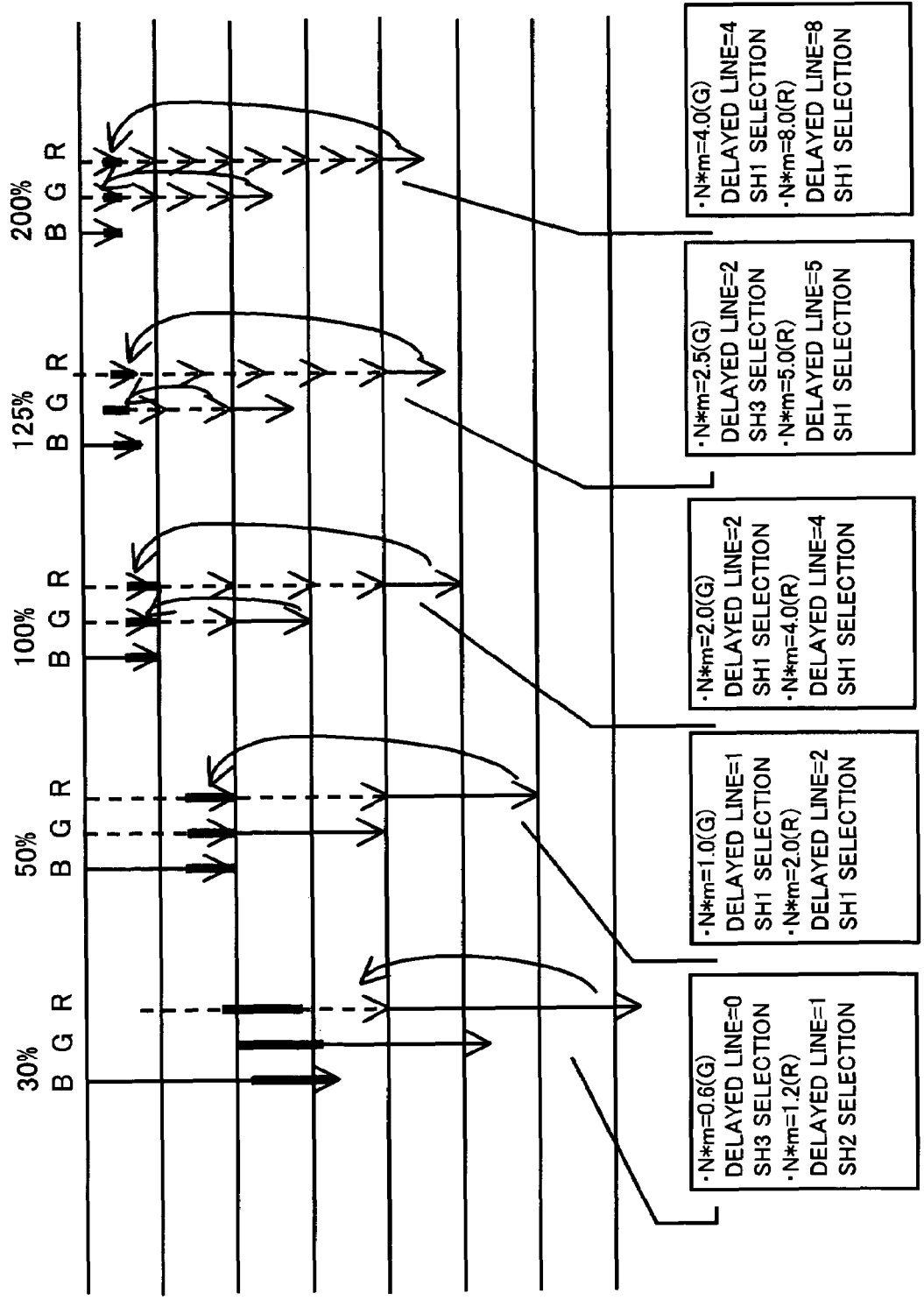
FIG. 9 is a schematic diagram showing line corrections and sub scanning position corrections of one gap and a line sensor in the color image scanning device according to the fourth embodiment of the present invention.

For example, in FIG. 9, in case the number of lines between the line sensors R-B is 4, and the number of lines between the line sensors G-B is 2, and the rate of magnification is 100%, between the line sensors R-B:

N*m=1.00*4/1=4.0, and (R-B)D(integral part)=4, d(decimal part)=0

Moreover, between the line sensors G-B:

N*m=1.00*2/1=2.0, and (G-B)D(integral part)=2, d(decimal part)=0

Figure 11:
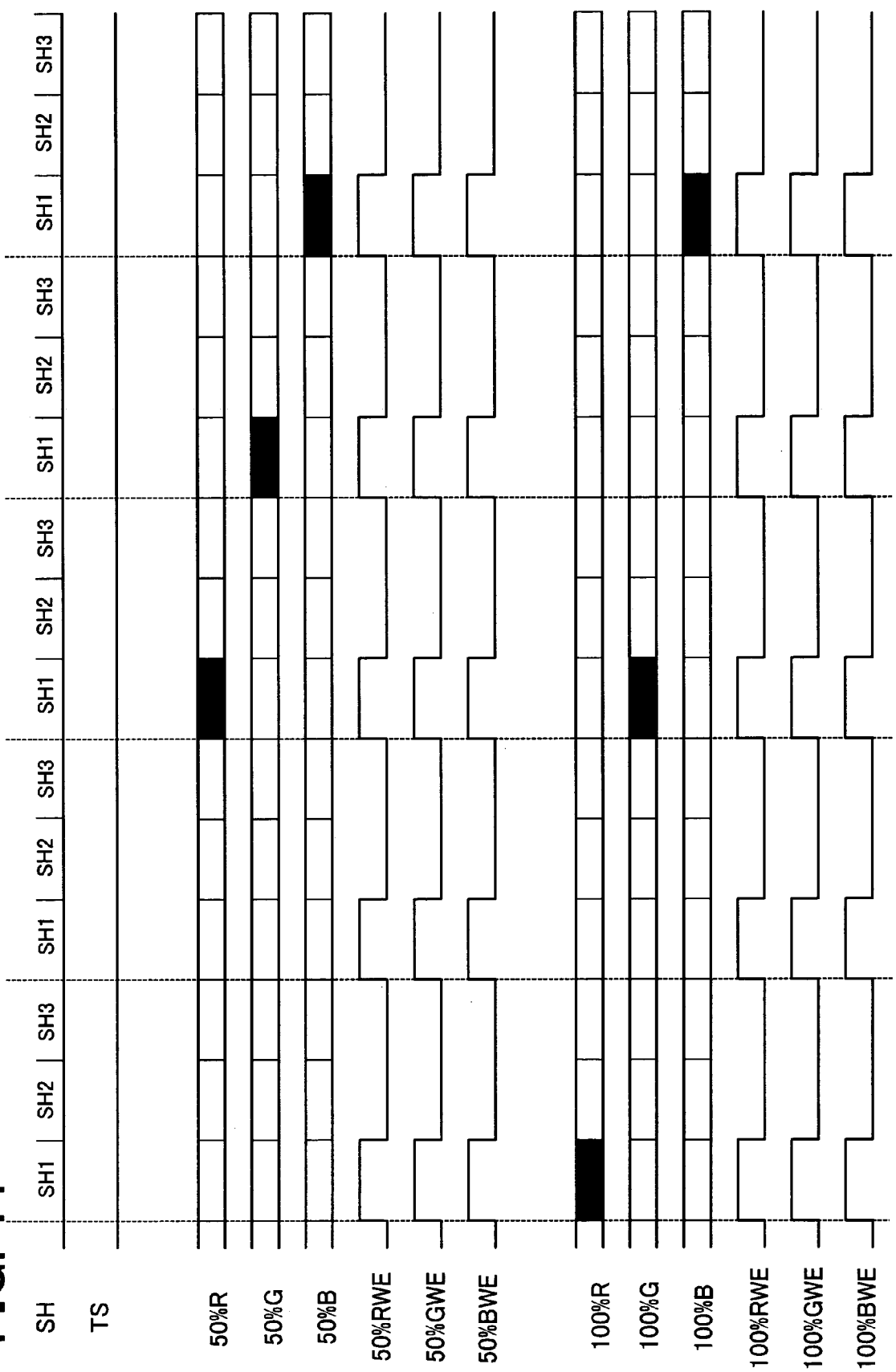
FIG. 11 is a time chart showing a line delay and a scanning timing when a rate of magnification is 50%, 100% in the color image scanning device according to the fourth embodiment of the present invention.

In this case, since it is 100% magnification, as shown in FIG. 11, in relation to the line sensor 302B, the data scanned by the line sensor 302R can be delayed by four lines, and the data scanned by the line sensor 302G can be delayed by two lines. A correction of the position in the sub scanning direction is not necessary. Therefore, at 100% magnification, the line sensors 302R, 302G and 302B are not driven at a cycle determined by dividing the scanning cycle TS by three, and the scanning data is not written into the line correction memories 306B, 306G and 306R at a cycle determined by dividing the scanning cycle TS by three. That is, the control process is carried out with the scanning cycle TS the same cycle as the driving cycle SH.

Next, in case the number of lines between the line sensors is the same as the above-described example and the rate of magnification is 125%, between the line sensors R-B:

N*m=1.25*4/1=5.0, and (R-B)D(integral part)=5, d (decimal part)=0

Between the line sensors G-B:

N*m=1.25*2/1=2.5, and (G-B)D(integral part)=2, d(decimal part)=0.5

Figure 12:
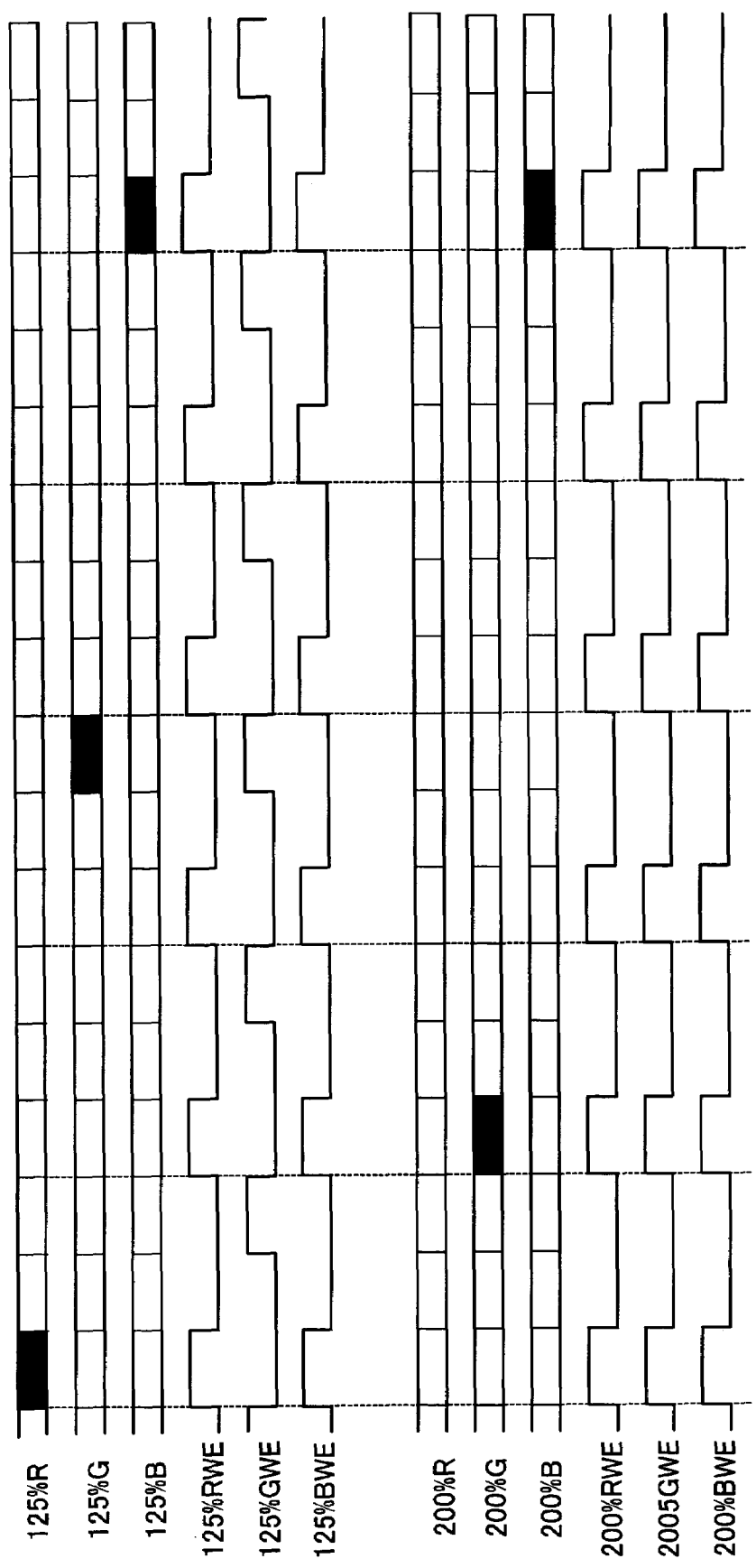
FIG. 12 is a time chart showing a line delay and a scanning timing when a rate of magnification is 125%, 200% in the color image scanning device according to the fourth embodiment of the present invention.

Therefore, as shown in FIG. 12, in relation to the line sensor 302B, the data scanned by the line sensor 302R is delayed by five lines, and the data scanned by the line sensor 302G is delayed by 2.5 lines.

Since the decimal part d=0, the timing signal SH1 is selected for the timing to write the data scanned by the line sensor 302R into the line correction memory 306R, in the same manner as the line sensor 302B. However, since the decimal part d=0.5, the timing signal SH3 is selected for the timing to write the data scanned by the line sensor 302G into the line correction memory 306G from the above conditional expression. In the fourth embodiment, under the correction mode, the gap correction according to the rate of magnification is carried out only at a reduction. Therefore, in case the rate of magnification is 125% which is an enlargement, the scanning process is carried out at the scanning cycle TS which is the same cycle as the driving cycle SH. That is, a process in which the scanning cycle TS is three times the driving cycle SH and one cycle is selected from the scanning cycle TS divided into three cycles to carry out the writing, is not carried out.

Next, in case the number of lines between the line sensors is the same as the above-described example and the rate of magnification is 200%, between the line sensors R-B:

N*m=2.0*4/1=8.0, and (R-B)D(integral part)=8, d(decimal part)=0

Between the line sensors G-B:

N*m=2.0*2/1=4.0, and (G-B)D(integral part)=4, d(decimal part)=0

Therefore, in relation to the line sensor 302B, the data scanned by the line sensor 302R is delayed by eight lines and the data scanned by the line sensor 302G is delayed by four lines. Since the decimal part d=0 between the line sensors R-B and between the line sensors G-B, the position in the sub scanning direction is not necessary to be corrected. In this case, since the rate of magnification is also an enlargement, the scanning process is carried out at the scanning cycle TS which is the same cycle as the driving cycle SH. That is, a process in which the scanning cycle TS is three times the driving cycle SH and one cycle is selected from the scanning cycle TS divided into three cycles to carry out the writing, is not carried out.

In case the number of lines between the line sensors is the same as the above-described example and the rate of magnification is 50%, between the line sensors R-B:

$N*m=0.5*4/1=2.0$, and (R-B)D(integral part)=2, d (decimal part)=0

Between the line sensors G-B:

$N*m=0.5*2/1=1.0$, and (G-B)D(integral part)=1, d(decimal part)=0

Therefore, as shown in FIG. 11, in relation to the line sensor 302B, the data scanned by the line sensor 302R is delayed by two lines, and the data scanned by the line sensor 302G is delayed by one line. Since the decimal part d=0 between the line sensors R-B and between the line sensors G-B, the position in the sub scanning direction is not necessary to be corrected. In this case, the gap correction can be carried out. Alternatively, although the rate of magnification is a reduction, the gap correction cannot be carried out exceptionally.

In case the number of lines between the line sensors is the same as the above-described example and the rate of magnification is 30%, between the line sensors R-B:

$N*m=0.3*4/1=1.2$, and (R-B)D(integral part)=1, d (decimal part)=0.2

Between the line sensors G-B:

$N*m=0.3*2/1=0.6$, and (G-B)D(integral part)=0, d(decimal part)=0.6

Figure 13:
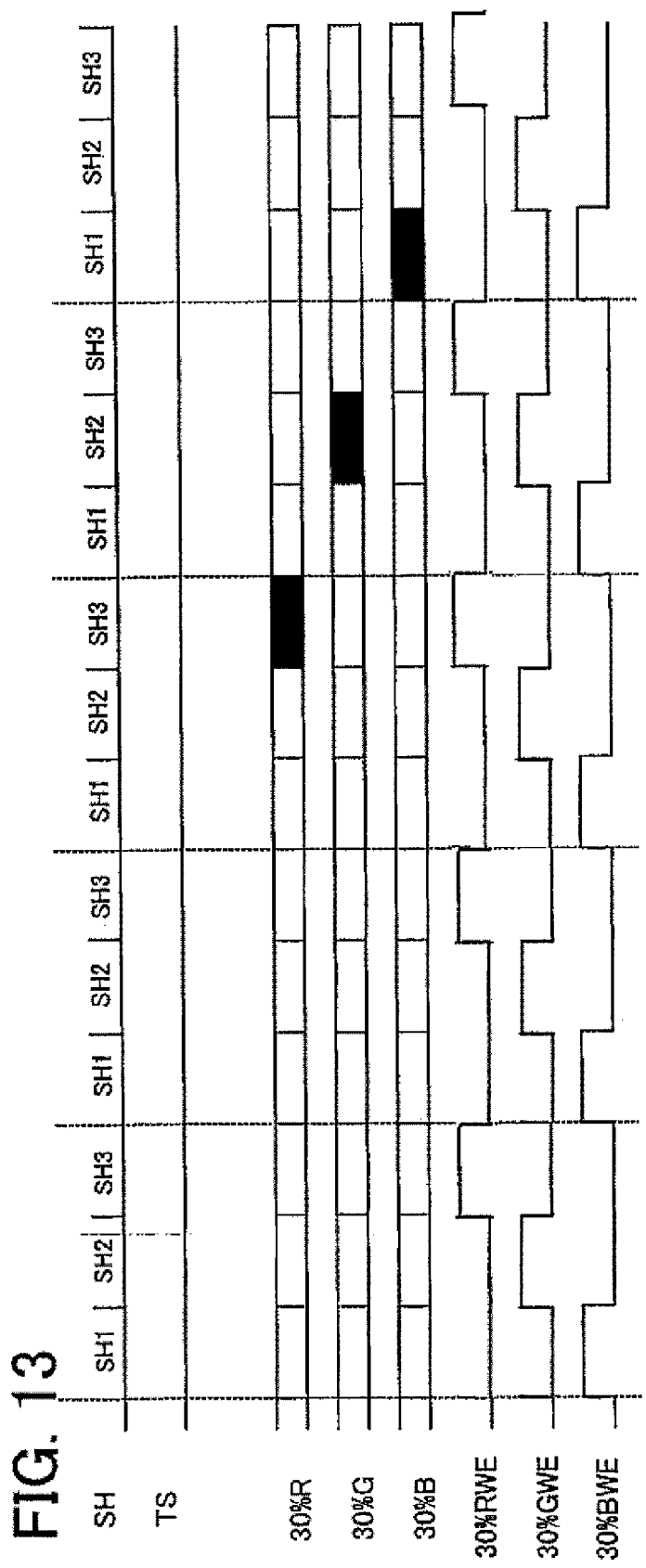
FIG. 13 is a time chart showing a line delay and a scanning timing when a rate of magnification is 30% in the color image scanning device according to the fourth embodiment of the present invention.

Therefore, as shown in FIG. 13, in relation to the line sensor 302B, the data scanned by the line sensor 302R is delayed by 1.2 lines, and the data scanned by the line sensor 302G is delayed by 0.6 line. In this case, since the rate of magnification is a reduction, the scanning cycle TS is three times the driving cycle SH, and one timing is selected from the timings SH1, SH2 and SH3 which have been divided into three timings from the scanning cycle TS. Then, the writing is made to the line correction memories 306B, 306G and 306R at the selected timing.

Since the decimal part d=0.2, the timing signal SH3 is selected for the timing to write the data scanned by the line sensor 302R into the line correction memory 306R. Since the decimal part d=0.6, the timing signal SH2 is selected for the timing to write the data scanned by the line sensor 302G into the line correction memory 306G.

In the fourth embodiment, in case the process accompanies the gap correction, the relative transferring speed becomes 1/M times the relative transferring speed of the process not accompanying the gap correction. Therefore, the scanning time of the process accompanying the gap correction requires approximately M times the scanning time of the process not accompanying the gap correction (three times in case of dividing by three as in the fourth embodiment). The line correction is a correction corresponding to the integral part of the number of pixels N*m. The gap correction is a correction corresponding to the decimal part of the number of pixels N*m. In case of the rate of magnification where the decimal part equals zero, only the line correction can be carried out and the gap correction is not necessary to be carried out.

In the fourth embodiment, under the correction mode, only at a reduction, the scanning signal cycle TS is three times the driving cycle SH, and the gap correction is executed for selecting one signal from the driving signals SH1, SH2 and SH3 which have been divided into three cycles from the scanning cycle TS. At 100% magnification and an enlargement, the scanning cycle TS is not divided into three cycles to carry out the driving, and the scanning signal cycle TS is the same cycle as the driving cycle SH. However, at an enlargement, the gap correction can be not carried out for all of the rate of magnifications, and the gap correction can be carried out for a part of the rate of magnifications. For example, at an enlargement with a low rate of magnification (an enlargement close to 100% magnification), the gap correction can be carried out. Among an enlargements between standard sizes, in case the rate of magnification is low (for example, from B5 size to A4 size), the gap correction can be carried out. Even at an enlargement, in case the rate of magnification is low, the effect of the gap correction is large compared with a case in which the rate of magnification is high. In addition, in case the rate of magnification is low, even when the gap correction is executed, the scanning time does not increase compared with the case in which the rate of magnification is high.

In the fourth embodiment, the scanning cycle of one line when executing the gap correction is three times the driving cycle. However, a multiple of the cycle is not limited to three and can be other numbers.

In the fourth embodiment, at a reduction of the correction mode, from the sample signals of the cycles SH1, SH2 and SH3 acquired by the acquiring unit 314, the data of only one cycle can be stored in the memory 316. However, all of the sample signals of the cycles SH1, SH2 and SH3 can be stored in the memory 316. Then, when outputting the data from the memory 316, according to the rate of reduction, the data of one of the cycles can be selected from the three stored data and the selected data can be output from the memory 316.

Figure 14:
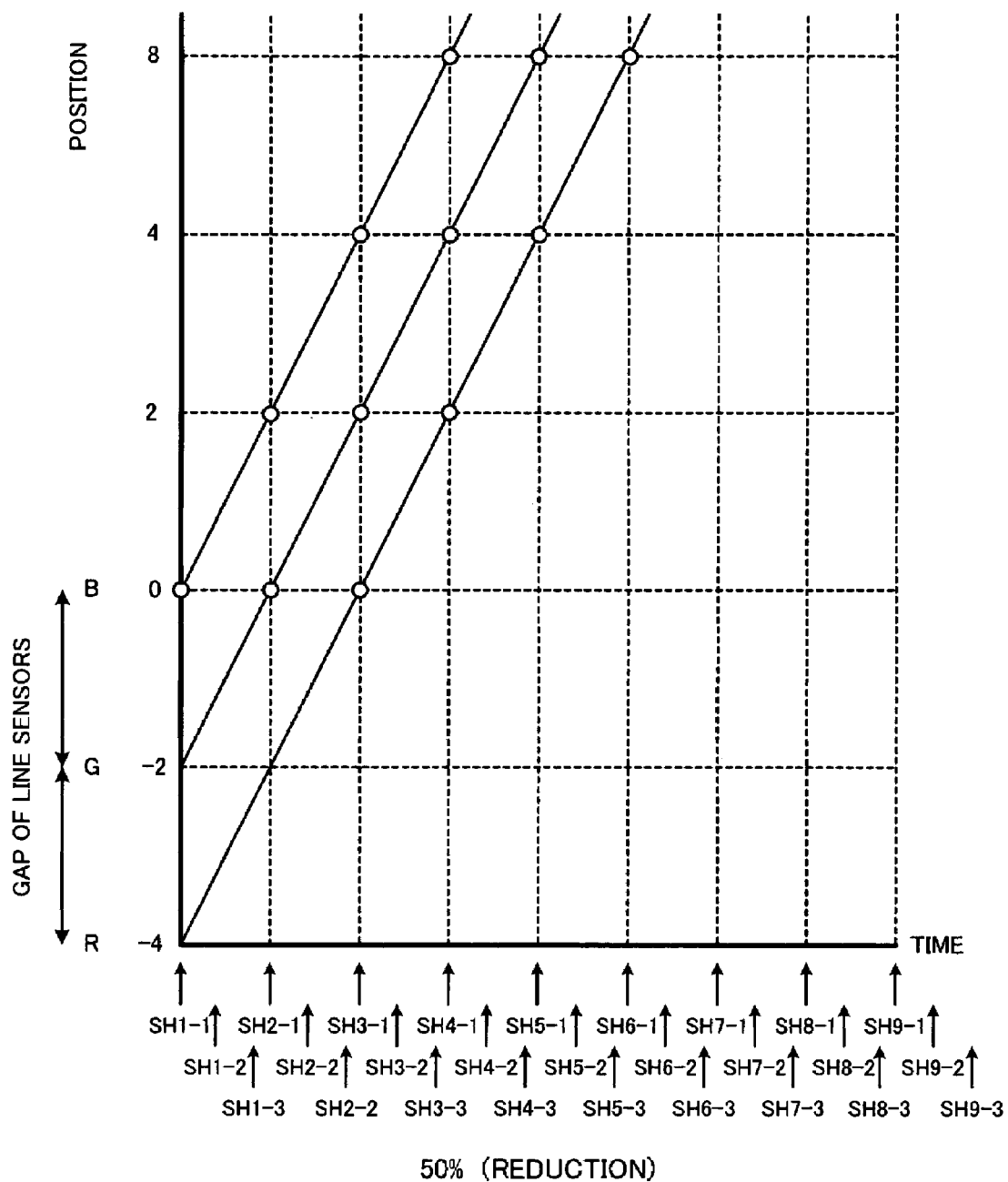
FIG. 14 is a graph showing a relationship between an elapse of time and the sampling positions of the line sensors when the rate of magnification is 50% in the color image scanning device according to the fourth embodiment of the present invention.
Figure 15:
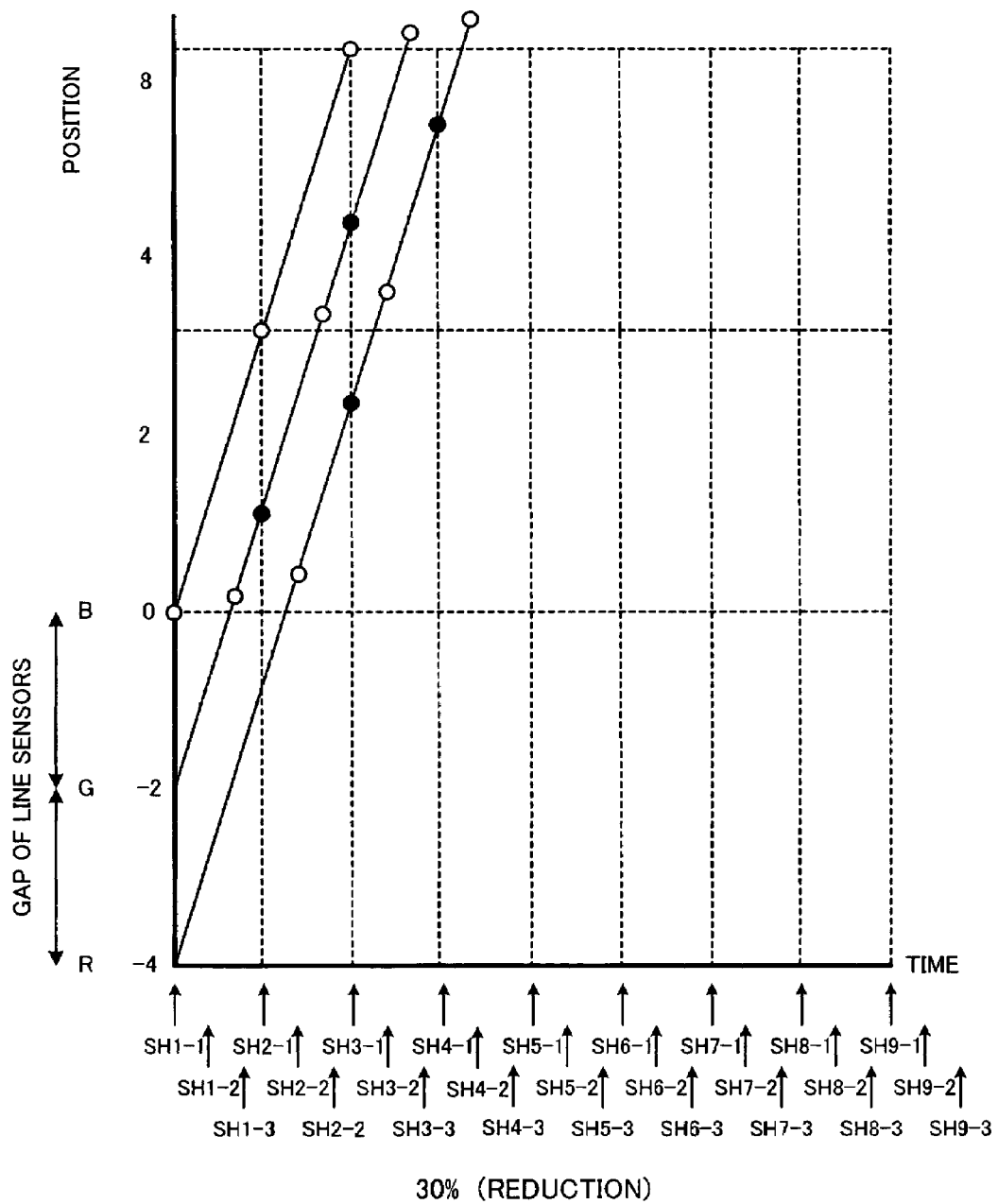
FIG. 15 is a graph showing a relationship between an elapse of time and the sampling positions of the line sensors when the rate of magnification is 30% in the color image scanning device according to the fourth embodiment of the present invention.
Figure 16:
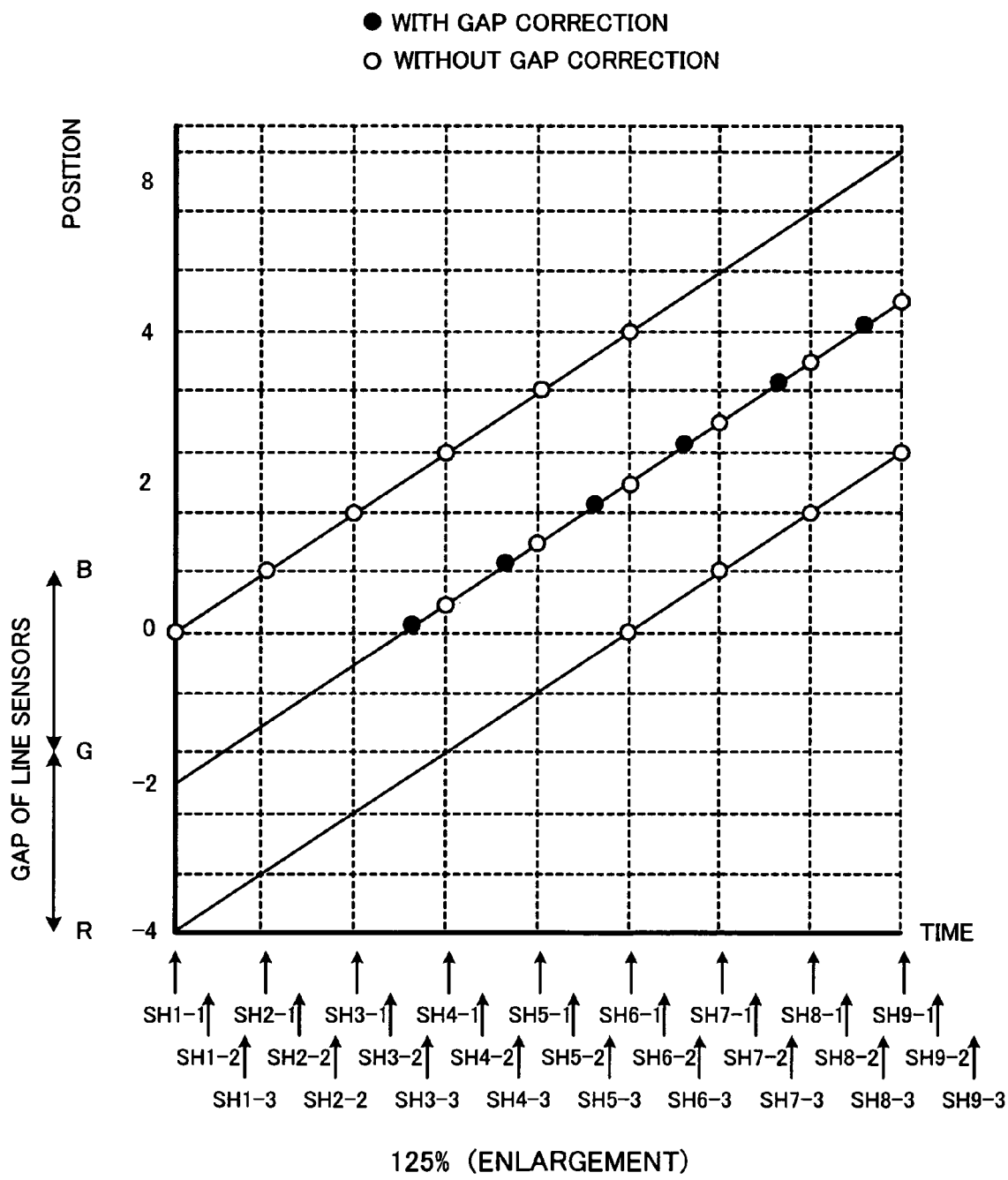
FIG. 16 is a graph showing a relationship between an elapse of time and the sampling positions of the line sensors when the rate of magnification is 125% in the color image scanning device according to the fourth embodiment of the present invention.

FIG. 14 through FIG. 16 show relationships between an elapse of time and the positions of each of the line sensors when the gap between the line sensors R-B is four lines and the gap between the lines sensors G-B is two lines and the rate of magnification is respectively 50%, 30% and 125%. In particular, when referring to FIG. 15 and FIG. 16 where the rate of magnification is respectively 30% and 125%, compared with the conventional technology, the present invention can output the R signal, the G signal and the B signal located closer to the same scanning line. Further, in the conventional technology, the correction is carried out according to only the number of lines. In the present invention, the correction is carried out according to the number of lines and by further dividing the interval between the lines into a plurality of intervals.

Without complicating the selection circuit or the like especially with respect to the conventional technology, to correct the gap according to the rate of magnification, the relative transferring speed of the original document and the line sensor can be set always at 1/M times the speed corresponding to the scanning rate of magnification. In addition, the scanning cycle can be M times the driving cycle, and a prescribed sample value can be selected from M sample values obtained within one scanning cycle as the scanning value. However, under this method, regardless of the rate of magnification, in case the gap correction is carried out at all times when necessary, especially at an enlargement with a high rate of magnification, although the effect of the gap correction is small compared with a reduction, the scanning time takes an extremely long period of time compared with a reduction. According to the fourth embodiment, while maintaining the effect of the gap correction, an effect applied to the long period of the scanning time can be minimized.

What is claimed is:

1. A color image processing device, comprising:
a plurality of line sensors provided in parallel with a main scanning direction at a prescribed interval between one another;
means for accumulating output values of the line sensors received at a prescribed cycle;
means for transferring relatively an original document and sampling positions of the line sensors;
means for generating image data according to a rate of magnification for scanning the original document in accordance with the output values received from each of the line sensors;
means for controlling the means for transferring under one of a first mode and a second mode, wherein under the first mode, the means for controlling controls a relative transferring speed of the original document and the sampling positions of the line sensors by the means for transferring so that the output values can be acquired at a plurality of timings while the sampling positions of the line sensors transfer a prescribed distance with respect to the original document, and under the second mode, the means for controlling controls the transferring speed so that one of the output values can be acquired while the sampling positions of the line sensors transfer the prescribed distance with respect to the original document; and
means for moving the means for controlling under one of the first mode and the second mode designated by a user by receiving the designation of one of the first mode and the second mode from the user.

2. The color image processing device according to claim 1, further comprising:
means for setting the rate of magnification,
wherein when 100% magnification is set by the means for setting, the means for controlling switches a default state into the second mode in advance, and when an enlargement or a reduction is set by the means for setting, the means for controlling switches the default state into the first mode in advance.

3. The color image processing device according to claim 1, further comprising means for setting a default state in the means for controlling under one of the first mode and the second mode in advance.

4. A color image processing device, comprising:
a plurality of line sensors arranged at a prescribed interval between one another in a sub scanning direction;
means for acquiring sample values of an image of an original document at a prescribed driving cycle from the plurality of the line sensors;
means for storing the sample values for a plurality of lines;
means for transferring relatively the original document and sample positions of the line sensors on the original document;
means for setting a scanning rate of magnification for scanning the original document; and
means for controlling a relative transferring speed by the means for transferring,
wherein the means for controlling controls to switch between a first mode and a second mode in accordance with the set rate of magnification, wherein under the first mode, the relative transferring speed is set 1/M times a speed corresponding to the scanning rate of magnification (where M is an integer), a scanning cycle is set M times the driving cycle and a prescribed sample value is selected from M sample values acquired in one scanning cycle as a scanning value, and under the second mode, the relative transferring speed is set at the speed corresponding to the scanning rate of magnification and the scanning cycle is corresponded with the driving cycle.

5. The color image processing device according to claim 4, wherein when 100% magnification or an enlargement is set as the set rate of magnification, the means for controlling selects the second mode, and when a reduction is set as the set rate of magnification, the means for controlling selects the first mode.

6. The color image processing device according to claim 4, wherein when 100% magnification or an enlargement with a high rate of magnification is set as the set rate of magnification, the means for controlling selects the second mode, and when a reduction or an enlargement with a low rate of magnification is set as the set rate of magnification, the means for controlling selects the first mode.

7. The color image processing device according to claim 4, further comprising means for operating to select one of a normal mode and a correction mode, wherein when the correction mode is selected, the means for controlling switches between the first mode and the second mode.

8. A color image processing method, comprising:
receiving a designation of one of a first mode and a second mode from a user;
transferring to control a relative transferring speed of an original document and sampling positions of line sensors provided in parallel to a main scanning direction at a prescribed interval between one another so that when receiving the designation of the first mode, output values can be acquired at a plurality of timings while sampling positions of a plurality of line sensors transfer a prescribed distance with respect to the original document, and when receiving the designation of the second mode, one of the output values can be acquired while the sampling positions of the plurality of the line sensors transfer the prescribed distance with respect to the original document; and
generating image data according to a rate of magnification for scanning the original document in accordance with output values output from each of the line sensors, while relatively transferring the original document and the sampling positions of the line sensors.

9. The color image processing method according to claim 8, further comprising the step of:
setting a rate of magnification for scanning the original document;
wherein at the step of receiving, when a 100% magnification is set at the step of setting, a default state is switched to the second mode in advance, and when an enlargement or a reduction is set at the step of setting, the default state is switched to the first mode in advance.

10. A color image processing method, comprising:
setting a scanning rate of magnification for scanning an original document;
selecting one of a first mode and a second mode in accordance with the set scanning rate of magnification; and
scanning, wherein when the first mode is selected, to carry out a scanning process by selecting a prescribed sample value from M sample values acquired within one scanning cycle (where M is an integer), which is M times a driving cycle, as a scanning value while relatively transferring the original document and sample positions on the original document at a speed 1/M times a speed corresponding to the scanning rate of magnification, and when the second mode is selected, to carry out a scanning process for acquiring a sample value of an image of the original document at a prescribed driving cycle while relatively transferring the original document and the sample positions of line sensors on the original document at the speed corresponding to the scanning rate of magnification.

11. The color image processing method according to claim 10, wherein at the step of selecting, when a 100% magnification or an enlargement is set as the scanning rate of magnification, the second mode is selected, and when a reduction is set as the scanning rate of magnification, the first mode is selected.

12. The color image processing method according to claim 10, wherein at the step of selecting, when a 100% magnification or an enlargement with a high rate of magnification is set as the scanning rate of magnification, the second mode is selected, and when a reduction or an enlargement with a low rate of magnification is set as the scanning rate of magnification, the first mode is selected.

* * * * *